United States Patent [19]

Segall

[11] 4,215,274
[45] Jul. 29, 1980

[54] X-RAY DETECTOR WITH PICOSECOND TIME RESOLUTION
[75] Inventor: Stephen B. Segall, Ann Arbor, Mich.
[73] Assignee: KMS Fusion, Inc., Ann Arbor, Mich.
[21] Appl. No.: 863,941
[22] Filed: Dec. 23, 1977
[51] Int. Cl.² .............................................. G01T 1/20
[52] U.S. Cl. ................................ 250/361 R; 250/368
[58] Field of Search ................... 250/361 R, 368, 362, 250/397, 363, 369

[56] References Cited
U.S. PATENT DOCUMENTS

| | | | |
|---|---|---|---|
| 2,448,963 | 9/1948 | Dicke | 250/368 |
| 3,049,619 | 8/1962 | Genovese | 250/362 |
| 3,805,075 | 4/1974 | Roberts | 250/368 |
| 3,984,332 | 10/1976 | Nelson et al. | 250/361 R |

Primary Examiner—Bruce C. Anderson
Attorney, Agent, or Firm—Barnes, Kisselle, Raisch & Choate

[57] ABSTRACT

An X-ray detector for obtaining time resolved signals from intense pulsed X-ray sources, such as from a fuel pellet during a laser fusion process. The detector has a cathode which emits electrons when bombarded by X-rays from the fuel pellet. The electrons are accelerated by an electron accelerator to relativistic velocities and impinge on a Cherenkov emitter which radiates light. An optical system collects and focuses the radiated light onto an image converter streak camera or other fast photodetector to provide a trace of the light intensity as a function of time. Time resolved images of the fuel pellet may be produced by the detector and recorded by an image converter streak camera or by a camera using an optical Kerr cell shutter.

42 Claims, 22 Drawing Figures

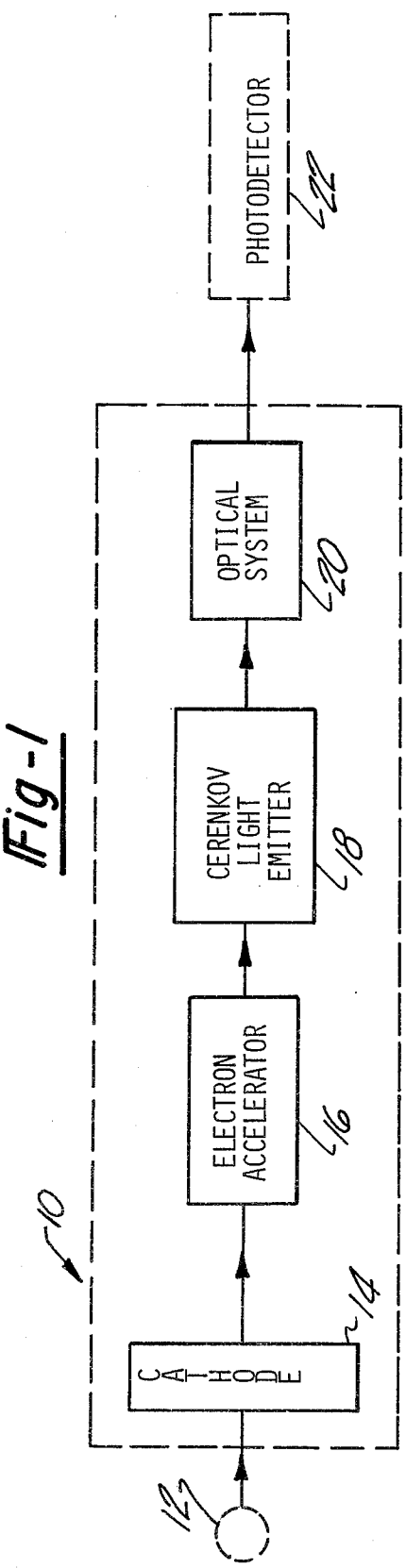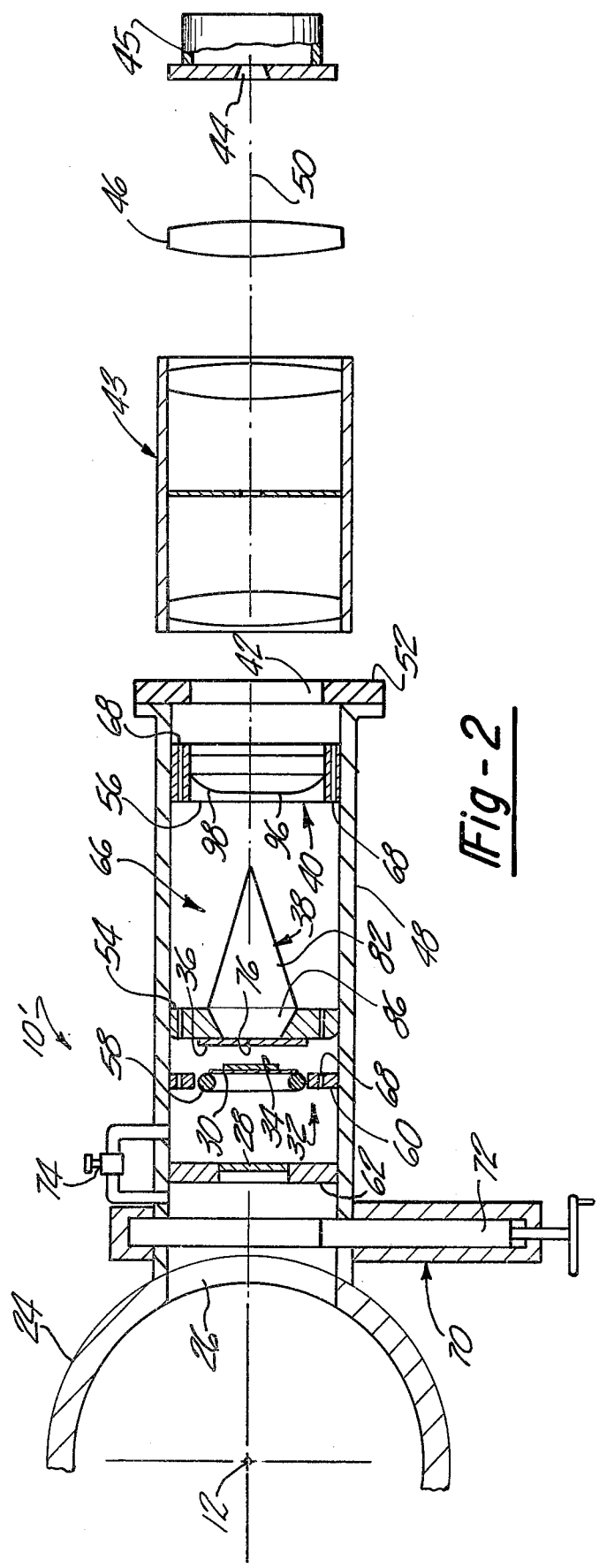

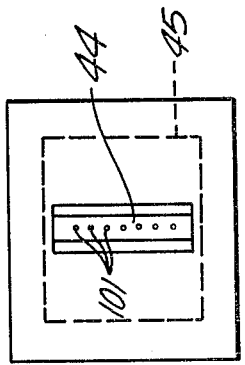
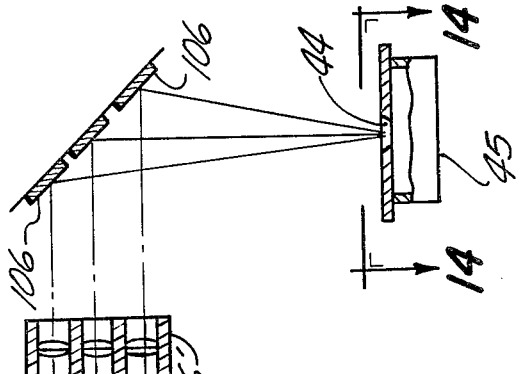
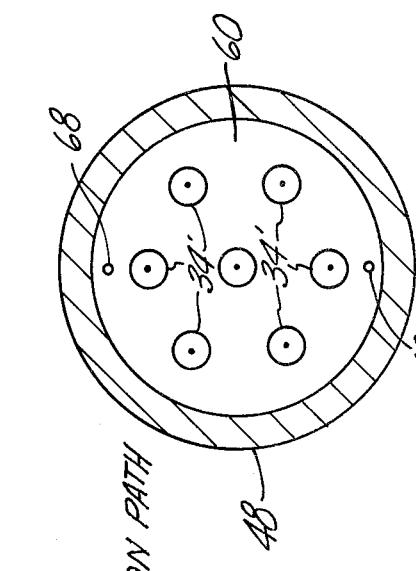
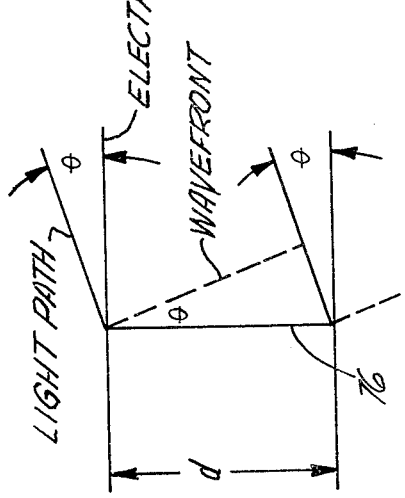
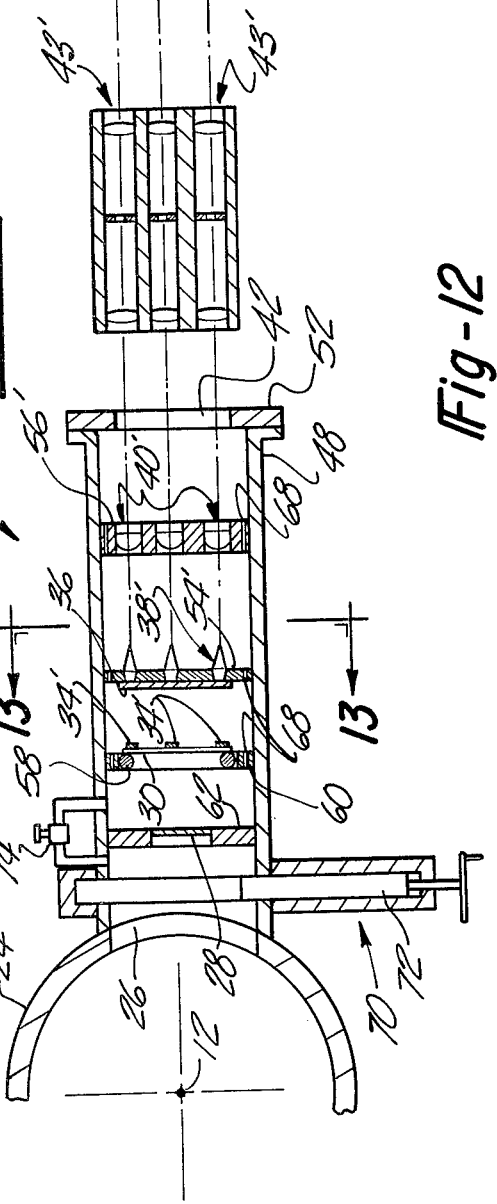

X-RAY DETECTOR WITH PICOSECOND TIME RESOLUTION

This invention relates to the time resolved detection of X-rays and charged atomic particles with particular application to the time resolved detection of X-rays emitted from the fuel pellet in a nuclear fusion reaction.

In a laser driven fusion process both the irradiation of the fuel pellet by the laser beam and the fusion reaction produce X-rays which, if monitored, will provide useful information about the manner in and conditions under which the laser fusion process occurs. When the fusion of the fuel in the pellet occurs, neutrons, alpha particles and other fusion products may also be produced which could be monitored to provide useful information about the manner in and conditions under which fusion occurs. However, neutrons and other fusion products are only produced at the peak of the implosion of a fuel pellet when fusion of the fuel occurs while X-rays are produced during the entire implosion process and even for a time after fusion of the fuel takes place and the pellet begins to disassemble. Thus, monitoring of the X-rays in a laser driven fusion process is believed to provide information on the development of instabilities in the imploding fuel pellet, the symmetry of the implosion, the velocity and temperature history of the imploding shell of the fuel pellet, and the temperature and density of the fuel in the pellet at peak compression.

The monitoring of X-rays is believed to provide this useful information even if fusion does not occur and, hence, when no neutrons or other fusion products are produced or when the number of neutrons produced is too small for obtaining useful information from the monitoring thereof. In order to analyze the various stages or steps of this laser fusion process, a detector device must have a time resolution on the order of ten picoseconds or less since the burst of X-rays from the fuel pellet at peak compression, during which time thermonuclear burn occurs, is only expected to last on the order of ten picoseconds to a few tens of picoseconds.

Objects of this invention are to provide an X-ray detector having a fast enough response time to enable time resolution of the quantity of X-rays produced by a laser driven fusion reaction process, determine the temperature and compression of the fuel pellet at various stages of the laser fusion process, and photograph time resolved images of the fuel pellet and plasma during the laser fusion process.

These and other objects, features and advantages of this invention will be apparent from the following description, appended claims and accompanying drawings in which:

FIG. 1 is a block diagram of an X-ray detector embodying this invention.

FIG. 2 is a semi-schematic side view in section of an X-ray detector embodying this invention mounted on a fusion reactor chamber and having a conical lens Cherenkov light emitter.

FIG. 11 is a diagram illustrating the different positions of the wave fronts of two rays of light emitted in the same plane as Cherenkov radiation from two spaced apart electrons entering the emitter lens of FIG. 2 at the same instant of time.

FIG. 12 is a semi-schematic side view in section of a modified X-ray detector embodying this invention mounted on a fusion reactor chamber and having multiple conical lens Cherenkov light emitters.

FIG. 13 is a cross sectional view on line 13—13 of FIG. 12 showing an end view of the array of multiple conical lens emitters of the X-ray detector of FIG. 12.

FIG. 14 is a plan view of the entrance slit of an image converter camera of the X-ray detector of FIG. 12 showing the light focused in a plurality of spots at the slit.

DESCRIPTION OF SINGLE SPOT INTENSITY DETECTOR

Figure 3:
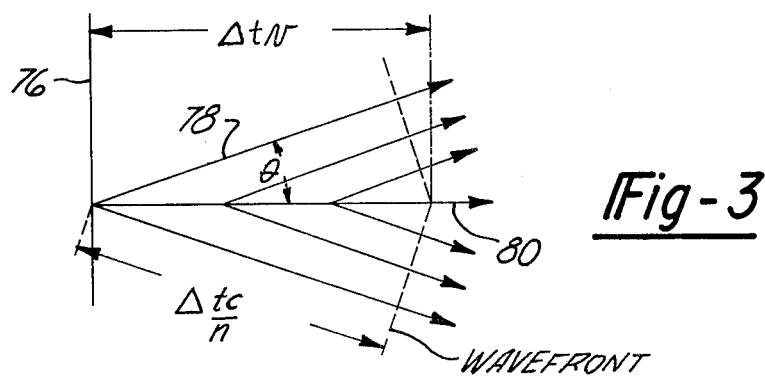
FIG. 3 is a diagram of Cherenkov emission of a conical wave front of light by a relativistic electron passing through a transparent material.

Referring in more detail to the drawings, FIG. 1 illustrates a block diagram of an X-ray detector 10 embodying this invention in which X-rays emitted from an irradiated fuel pellet 12 strike a metallic cathode 14 causing electrons to be emitted therefrom in accordance with the well-known photoelectric effect. The emitted electrons are accelerated to a velocity approaching the speed of light in a vacuum by an electron accelerator 16 and enter a Cherenkov emitter 18 which emits light, a sizable fraction of which is in the visible and near ultraviolet part of the spectrum. In a so-called Cherenkov emitter, if a charged atomic particle, such as an electron, moves through a transparent solid or liquid medium with a velocity greater than the velocity of light in the medium, nearby atoms of the medium are momentarily electrically polarized which disturbs the electric field of such atoms, thereby producing a transient dipole moment which causes emission of electromagnetic waves of light.

The light from the Cherenkov emitter 18 is collected and focused by a suitable optical system 20 onto a photodetector 22 with a rapid response time. A trace of the intensity of the light as a function of time and, hence, the magnitude of the X-ray emission from fuel pellet 12 as a function of time, may be produced by a photodetector such as an image converter streak camera. Optical system 20 may also be designed to reconstruct an image of the pellet which may be recorded by a suitable photodetector with a fast optical response time to provide a time and space resolved record of the image of the fuel pellet during various stages of the laser fusion process.

FIG. 2 illustrates an X-ray detector 10' embodying this invention mounted on a laser fusion reactor chamber 24 with a fuel pellet 12 therein. X-rays emitted by fuel pellet 12 pass through a vacuum port or exit aperture 26 in reactor chamber 24 and into detector 10' through an X-ray transmitting aperture and window 28 separating the low vacuum of the target chamber from the high vacuum of the X-ray detector. The X-rays pass through one plate 30 of a parallel plate capacitor accelerator 32 and impinge on a cathode 34 which emits electrons. The electrons emitted from cathode 34 are accelerated between plates 30 and 36 of the parallel plate capacitor which is supplied with a high potential by either a pulsed high voltage source such as a Marx generator or by a direct current high voltage power supply. The electrons accelerated by parallel plate capacitor 32 pass through plate 36 thereof and bombard a Cherenkov emitter in the form of a conical lens 38. A fraction of the light from conical emitter lens 38 is collected and emitted as substantially parallel rays by a lens 40 and passes from detector 10' through a plane window 42. The light from detector 10' passes through a pinhole spatial filter 43 which removes nonparallel components of the light and is collected and focused to a spot at the entrance slit 44 of an image converter camera 45 by an optical focusing system represented by converging lens 46. Filter 43 is optional for a single spot detector since entrance slit 44 removes nonparallel rays which extend generally perpendicular to the longitudinal length of the slit so that such nonparallel rays do not reach camera 45.

Light passing through entrance slit 44 impinges on a cathode of image converter camera 45 and causes the cathode to emit a flux of electrons. When camera 45 is operated in the streak mode, this flux of electrons is swept across a fluorescent screen to produce a trace of light as a function of time. The intensity of this trace of light is proportional to the intensity of the light focused on entrance slit 44. An image intensifier is used with camera 45 to amplify or increase the intensity of the trace of light produced by camera 45 so that such trace of light can be recorded on sensitive photographic film. Other examples of photodetectors which it is believed may be used to detect the light emitted from picosecond X-ray detector 10' are cameras using optical Kerr cell shutters actuated by picosecond laser pulses such as those developed by M. A. Dugay and J. W. Hansen at Bell Telephone Laboratories and described in Applied Physics Letters 15, 192 (1969) and picosecond photocathode ray tubes such as those developed by C. Lotz and G. Clement at the Laboratories d'Electronique et de Physique Appliquee, and described in the May, 1974 issue of electro Optical Systems Design. All of these photodetectors are believed to have a response time of less than fifty picoseconds and are believed to be capable of a response time on the order of ten picoseconds or less. These response times are needed to detect the quantity as a function of time of the X-rays produced by a laser driven fusion reaction or to record time resolved images of the fuel pellet and plasma during the laser fusion process.

Cathode 34 is a thin layer of a material with a high atomic number, Z, such as titanium, nickel, tin or gold deposited on the face of accelerator plate 30 farthest from fuel pellet 12. By selecting different high Z materials with different X-ray K edges for the cathode, the detector may be made responsive to different portions of the spectrum of X-rays emitted from fuel pellet 12. The quantity of electrons produced by the cathode 34 may be maximized for a given X-ray spectral distribution by selection of the appropriate material for the cathode and the thickness thereof. Selective spectral sensitivity can also be achieved by coating the cathode with a single high atomic number material such as gold and placing thin attenuating filters of various materials in front of window 28. Alternatively, selective filter pairs could be made by filtering the incoming signal with one absorber and selecting the deposited cathode material to preferentially absorb a narrow spectral band of the filtered signal entering the detector.

In detector 10', window 28, cathode 34, parallel plates 30 and 36 of capacitor 32, conical emitter lens 38, converging lens 40, and window 42 are mounted in an elongate tubular housing 48 of a material such as stainless steel on a common axis 50 which is coincident with fuel pellet 12. window 42 is mounted in a ring 52 fixed to the flange end of tubular housing 48 and optical elements 38 and 40 are mounted in rings 54 and 56 received in the tubular housing. The parallel plate 30 of capacitor 32 is fixed to a ring 58 received in an annular carrier plate 60 mounted in tubular housing 48 and X-ray window 28 is mounted on a carrier ring 62 received in the housing. The optical components and carrier rings may be mounted on manipulator stages in order to facilitate alignment of the optical system.

Window 28 and plate 30 of capacitor 32 may be made of a beryllium foil having a thickness on the order of one to a few thousandths of an inch. Plate 36 of capacitor 32 may be a thin layer of a conductive material of the order of 1000 angstroms or more deposited directly on the face of conical emitter lens 38 and carrier plate 54. A high potential V may be applied to plate 30 of capacitor 32 through ring 58 with carrier plate 60 being made of an insulating material and plate 36 being grounded through carrier ring 54. Alternatively, in order to decrease the voltage drop between capacitor plate 30 and tubular housing 48, thereby minimizing the chance of breakdown between the housing and the capacitor plate, both carrier rings 60 and 54 may be made of an insulating material and half of the total potential V of oppposite polarity may be applied to each plate 30 and 36. For example, a potential of $-V/2$ could be applied to plate 30 and a potential of $+V/2$ applied to plate 36.

Cathode 34, parallel plate capacitor 32 and Cherenkov emitter 38 operate in a highly evacuated chamber 66 defined by the cooperation of tubular housing 48, light window 42, and X-ray window 28. The various portions of chamber 66 are interconnected by passages 68 through carrier rings 54, 56, and 60. Beryllium X-ray window 28 separates chamber 66 of detector 10' from the less highly evacuated reactor chamber 24 (about $10^{-8}$ torr vs. $10^{-5}$ torr). Since beryllium window 28 must be made thin enough to permit X-ray emission from fuel pellet 12 to pass therethrough, it might rupture if chamber 24 were subjected to atmospheric pressure while chamber 66 was evacuated, such as when reactor chamber 24 is opened to the atmosphere. To prevent such rupture of window 28, a gate valve 70 with an atmospheric supporting plate 72 may be mounted on housing 48 between reactor chamber 24 and beryllium window 28. In the open position of valve 70, plate 72 is retracted so that X-rays can pass through window 28 and, in the closed position, plate 72 seals chamber 66 and beryllium window 28 from communication with reactor chamber 24, thereby preventing the window 28 from being subjected to the pressure within chamber 24. A bypass valve 74 enables both faces of window 28 to communicate with chamber 66 when gate valve 70 is closed, thereby preventing window 28 from being subjected to a pressure differential.

Chamber 66 is initially evacuated with gate valve 70 closed and bypass valve 74 open and, when fully evacuated, bypass valve 74 is closed. After chamber 24 has also been evacuated gate valve 70 is opened to permit X-rays emitted from fuel pellet 12 to pass through detector 10' and impinge on cathode emitter 34. When X-ray detector 10' is in operation bypass valve 74 will always be closed. Housing 48 of detector 10' may also have several ports therein (not shown) which are used for electrical feed throughs, vacuum pumping, alignment of optical elements, and adjustment of the distance between plates 30 and 36 of parallel plate capacitor 32.

Figure 4:
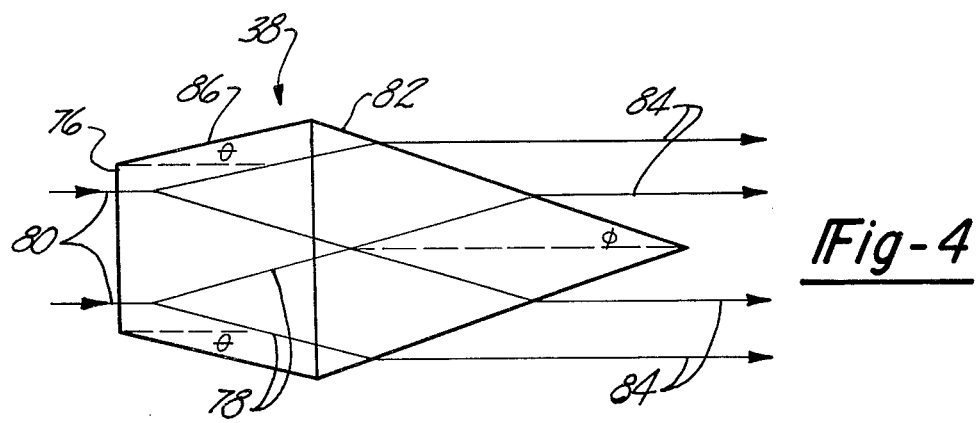
FIG. 4 is a diagram of rays of light emitted as Cherenkov radiation in a conical emitter lens of the X-ray detector of FIG. 2.
Figure 5:
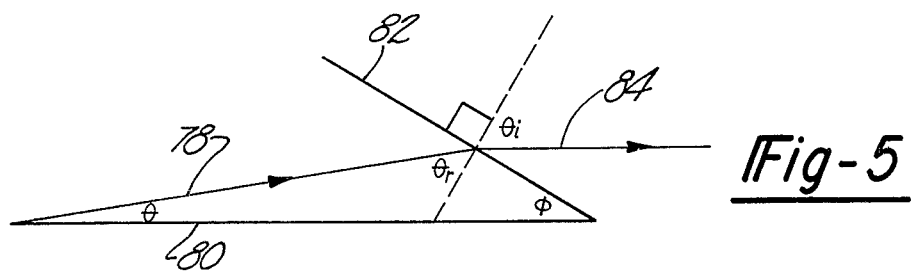
FIG. 5 is a diagram of the geometric relationship of the path of a relativistic electron in the conical emitter lens of FIG. 2 to the rays of light emitted by Cherenkov radiation therein.

As shown in FIG. 3, when an electron accelerated by capacitor 32 to a relativistic velocity passes into conical lens 38 through entrance end 76, light rays 78 are emitted by Cherenkov radiation in a cone with a half angle $\theta$ to the path of the electron which may be defined by the following expression:

$$\cos \theta = 1/\beta n \quad (1)$$

where
$\beta = v/c$
n = the index of refraction of the transparent material,
v = the velocity of the electron in the transparent material, and
c = the speed of light in a vacuum. As shown in FIG. 4, the half angle $\phi$ of the conical exit surface 82 of lens 38 is chosen so that those light rays 78 which are emitted at an angle $\theta$ relative to the optical axis and in a plane defined by the axis of the conical lens and any radius vector of a cross section of the lens perpendicular to the optical axis will be refracted by exit surface 82 into parallel rays 84 of light. The half angle $\phi$ may be determined from the following relations obtained from FIG. 5:

$$\theta_i + \phi = \pi/2$$
$$\sin \theta_i = n \sin \theta_r$$
$$\sin \theta_r + \phi = \pi/2$$

from which the following is obtained:

$$\theta_i = \theta + \theta_r \text{ and}$$
$$\frac{\sin(\theta + \theta_r)}{\sin \theta_r} = \frac{\sin \theta \cos \theta_r + \cos \theta \sin \theta_r}{\sin \theta_r} = n,$$

from which may be obtained:

$$\tan \theta_r = \frac{\sin \theta}{n - \cos \theta} = \frac{1}{\tan(\theta + \phi)} \quad (2)$$

From equation 2 the following expression for the half angle $\phi$ of the conical exit surface 82 of lens 38 may be derived:

$$\tan \phi = \frac{n \cos \theta - 1}{n \sin \theta}$$

For a conical lens 38 with an index of refraction n = 1.335 bombarded by relativistic electrons with a velocity $\beta = 0.89$ the half angle $\theta$ at which Cherenkov radiation is emitted is 32.7° and the half angle $\phi$ is 9.73°. The frustoconical surface 86 of emitter lens 38 also has a half angle $\theta$ as shown in FIG. 4.

Figure 6:
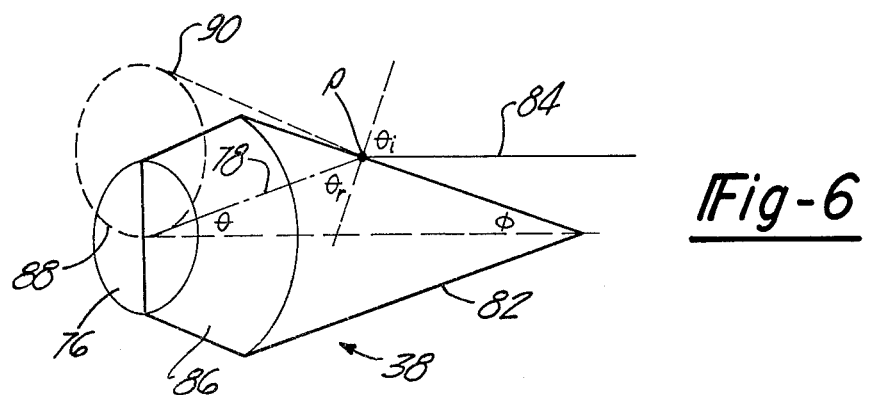
FIG. 6 is a diagram of the locus of all rays of light emitted by relativistic electrons in the conical emitter lens of FIG. 2 at an angle $\phi$ to its optical axis which pass through a point P on the exit surface of the conical emitter lens.
Figure 7:
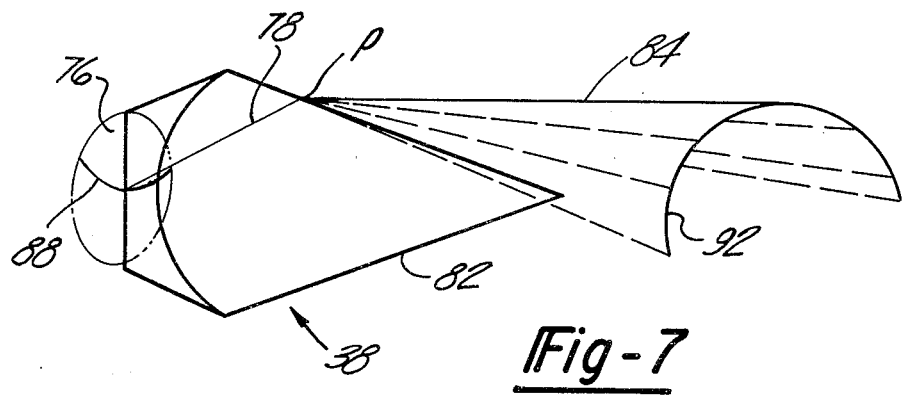
FIG. 7 is a diagram of all of the rays of light leaving a point P on the exit surface of the conical emitter lens of FIG. 2 which were produced by Cherenkov emission in the lens at an angle $\phi$ to its optical axis.

As shown in FIG. 6, since light produced by Cherenkov radiation is emitted in a cone of half angle $\theta$, the locus of all points on the surface of entrance end 76 of the conical lens that emit rays which are refracted at a point P on conical surface 82 of the lens is the circular arc 88 which is the intersection of the surface of entrance end 76 with a right circular cone 90 of half angle $\theta$ with its vertex at point P. Only one point of this circular arc 88 will lie in a plane defined by the axis of the cone and point P; and thus, only a small portion ds of arc 88 will emit light that will emerge from point P as parallel rays 84 of light. Rays of light emitted on circular arc 88 from other than segment ds will emerge from conical surface 82 at point P in an angle greater than $\theta_i$ and will be directed as shown in FIG. 7 in an arc 92 which is concave toward the optical axis of lens 38.

Figure 8:
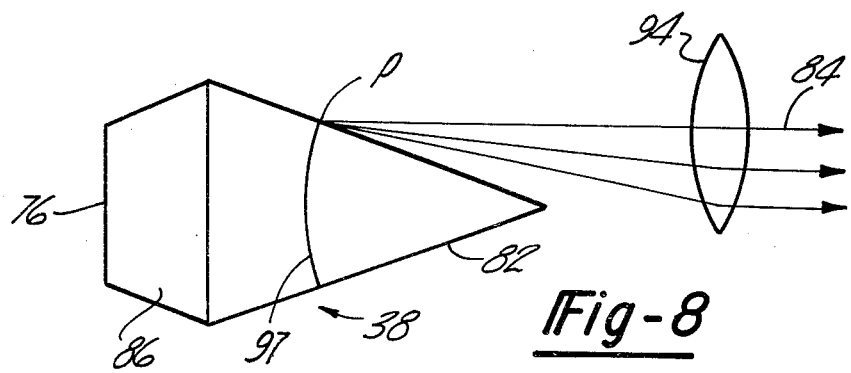
FIG. 8 is a diagram of a lens refracting skewed rays of light emitted from a point P on the exit surface of the conical emitter lens of FIG. 2 into parallel rays of light.
Figure 9:
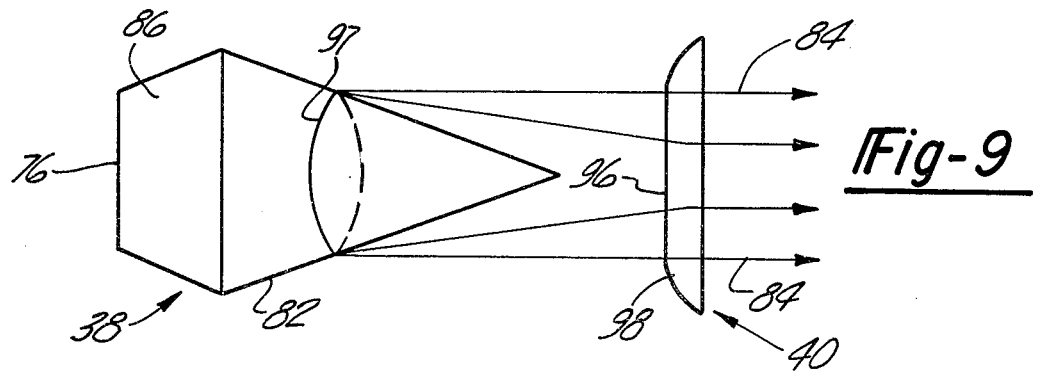
FIG. 9 is a diagram of an optical element refracting skewed rays of light emitted from the exit surface of the conical emitter lens of FIG. 2 into parallel rays of light.

As shown in FIG. 8, for any single point P on the conical surface 82 of lens 38, all of the emitted light, including the diverging rays, could be collected and converted into parallel rays of light by an ordinary convex lens 94 positioned so that its focal point is coincident with point P and the ray 84 parallel to the optic axis will pass through the center of the lens. Since the rays of light emerging from point P lie on a well-defined arc 92, it is only necessary to have a small segment of a lens to focus the light from point P and, therefore, entire lens 94 is unnecessary. This is true for any other point on a circle 97 of constant radius on the conical surface 82 of lens 38. Therefore, as shown in FIG. 9, collector lens 40 of device 10' has a plane surface 96 through which parallel rays 84 pass and a smooth surface 98 having the desired curvature to collect diverging light rays from all of the segments of the arc 92 for each point P such that a larger fraction of the total light produced as Cherenkov radiation in lens 38 emerges from lens 40 in parallel rays 84 of light. Lens 40 may have a diameter many times larger than emitter lens 38 in order to efficiently collect the diverging light rays.

Conical emitter 38 and collector lens 40 will not convert all of the light emitted as Cherenkov radiation into parallel rays of light. Light emitted by electrons which have undergone scattering in the emitter will not be collected. Also, since the light emitted in lens 38 is not monochromatic, different wavelengths of the light will be emitted and refracted at slightly different angles and, thus, only light within a narrow range of wavelengths will be converted into parallel rays of light by emitter lens 38 and collector lens 40. Furthermore, since the emitted light emerges from a band rather than a circle on surface 82 of lens 38, only part of the skewed rays produced by undeflected electrons and within the range of wavelengths for which the lenses 38 and 40 were designed, will be converted into parallel rays of light. Nevertheless, by designing conical lens 38 to emit a parallel beam of light at the wavelength of maximum radiation intensity and designing collector lens 40 to provide maximum flux in the parallel beam, a reasonable fraction of the light emitted by Cherenkov radiation can be collected and focused with sufficient intensity on image converter camera 45. Light rays of other wavelengths which are not deflected into parallel rays by lenses 38 and 40 will be excluded either by entrance slit 44 or by pinhole spatial filter 43 together with entrance slit 44. It is believed the parameters discussed herein will enable persons skilled in the art to design satisfactory conical emitters 38 and collector lenses 40 for detectors 10'.

DETERMINATION OF RESPONSE TIME

Figure 10:
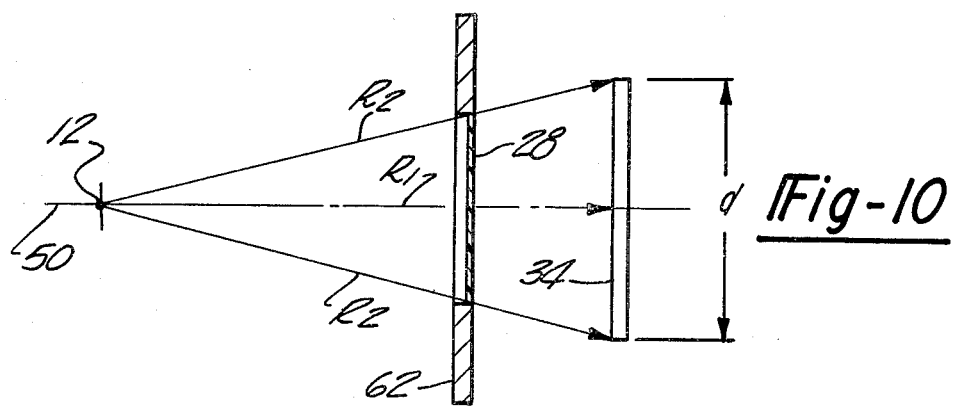
FIG. 10 is a diagram of the geometric relationship of the fuel pellet, aperture, and cathode of the detector of FIG. 2.

The response time of detector 10' may be degraded by a number of different phenomena and, hence, the effect of these phenomena on the response time should be considered in designing an optimal detector having a desired response time for a particular portion of the X-ray spectrum of a fuel pellet under a particular set of conditions. The size of the area of cathode 34 that is bombarded by X-ray emission from fuel pellet 12 affects the response time of detector 10'. As shown in FIG. 10, if fuel pellet 12 is essentially a point source, the distance $R_1$ traveled by an X-ray from the fuel pellet to the center of cathode 32 is less than the distance $R_2$ traveled by an X-ray from the fuel pellet to the edge of cathode 34. This difference in path length, $R_2-R_1$ results in a difference in arrival times for X-rays emitted from fuel pellet 12 at the same instant of time which produces a degradation of the response time $\Delta t$ equal to:

$$\Delta t = (R_2 - R_1)/c \quad (4)$$

where c is the speed of light in a vacuum. If the distance $R_1$ from the fuel pellet 12 to the cathode 34 is known and it is required that $\Delta t$ not exceed a maximum value $\delta$, the maximum diameter d of the X-ray absorbing cathode 34 is:

$$d = 2\sqrt{c^2\delta^2 + 2R_1 c\delta} \approx 2\sqrt{2R_1 c\delta} \quad (5)$$

If $\delta = 10^{-12}$ sec. and $R_1 = 50$ cm., then d = 3.46 cm. This source of degradation is generally small compared with the degradation due to other phenomena.

Although liberation of electrons in cathode 34 by X-rays is essentially instantaneous relative to a picosecond, a finite time is required for liberated electrons to travel through and leave the thin layer of cathode material. Electrons liberated at the surface of the layer will begin to be accelerated sooner than electrons liberated from deeper inside the layer which must first escape from inside the layer before they can be accelerated. The degradation of the time response due to this effect should be less than one picosecond.

The time resolution of detector 10' is also degraded by the spread in the axial component of the initial velocity of the electrons ejected from cathode 34. The initial spread in the axial component of the electron velocity produces a spread in time of arrival of the electrons at the Cherenkov emitter lens 38 for electrons emitted at the same instant of time from cathode 34, thereby degrading the time resolution of the x-ray signal. This degradation is equal to the difference in transit time between parallel plates 30 and 36 of the parallel plate accelerator 32 for electrons emitted from cathode 34 with the highest initial axial velocity and zero initial axial velocity. In order to minimize this difference in transit time and, hence, the degradation in response time due to the spread in initial electron axial velocities, the electric field accelerating the electrons should be as large as possible.

The degradation of the response time due to the spread in initial electron axial velocities can be calculated from the relativistic equations of motion. The general relativistic formula for the acceleration a(t) of a particle of rest mass $M_o$ and charge q in a uniform electric field E is given by $$a(t) = \frac{qE}{M_o}\left[1 - \frac{v(t)^2}{c^2}\right]^{3/2} \quad (6)$$

where v(t) is the particle velocity at time t and c is the speed of light in a vacuum. This equation can be integrated in the following way:

$$\int_{t=0}^{t=t} \frac{dv}{\left[1 - \frac{v^2}{c^2}\right]^{3/2}} = \frac{qE}{M_o} t \quad (7)$$

where a (t) = dv/dt. Using the boundary conditions $v = v_o$ at $t = 0$, the following expression for the transit time is obtained $$t = \frac{M_o}{qE}\left[\frac{v}{\sqrt{1 - \frac{v^2}{c^2}}} - \frac{v_o}{\sqrt{1 - \frac{v_o^2}{c^2}}}\right] \quad (8)$$

where v is the axial component of the final velocity of the electron arriving at plate 36 and $v_o$ is the axial component of the initial electron velocity at plate 30. The final velocity of the electron is given by the relativistic formula $$v^2 = c^2\left[1 + \frac{M_o c^2}{E_k + M_o c^2}\right] \cdot \left[1 - \frac{M_o c^2}{E_k + M_o c^2}\right] \quad (9)$$

where $E_k$ is the kinetic energy of the accelerated electron upon leaving the electric field.

If the accelerating potential across plates 30 and 36 of accelerator 32 is 600 keV and the distance between the plates is 6.0 millimeters, the electric field will be $10^6$ volts/cm, the final velocity attained by electrons with zero initial velocity will be v=0.8879c, and the electron transit time will be t=32.93 picosecond. If the greatest initial axial electron velocity is $5.9 \times 10^9$ cm/sec, corresponding to an initial kinetic energy of 10 keV, the kinetic energy of the electrons arriving at plate 36 would be 610 keV, their maximum attained velocity would be v=0.890c, and the electron transit time would be t=29.86 picoseconds. The degradation due to electron velocity spread would, therefore, be $t=3.07$ picoseconds.

Some electrons with initial kinetic energies greater than 10 keV can usually be expected for the X-ray spectrum produced by a laser irradiated fuel pellet 12, but these electrons are in most cases a negligibly small part of the total electron flux leaving cathode 34 and their effect on the response time should be undetectable. If all of the electrons have initial energies below 1 keV then acceleration by an electric field of $10^6$ V/cm through a potential of 600 keV will result in a time degradation of less than 1 picosecond.

If a large fraction of the emitted electrons are produced as the result of secondary collisions of photoelectrons with other electrons in the cathode then most of the electrons leaving the cathode may only have initial kinetic energies of the order of 10 eV or less. Under these conditions for a potential drop of 600 keV a time resolution of 1 picosecond could be achieved with an electric field of only $10^5$ V/cm. Since the accelerating potential must remain large in order to maximize the output of Cherenkov radiation, the smaller the accelerating electric field the greater the required distance between anode and cathode. If the interelectrode spacing becomes of the order of or greater than the anode and cathode diameters, then additional annular electrodes may be required between the cathode and anode to maintain a uniform accelerating electric field parallel to the detector axis. These electrodes would be similar to annular electrodes used in electron guns and electrostatic particle accelerators and methods for designing such electrodes are described in *Theory and Design of Electron Beams* by J. R. Pierce, Van Nostrand Publishing Co. (1954).

In order to reduce or eliminate the need for specially designed intermediate electrodes it is preferable to operate this detector at the highest permissible electric field, even if the electron velocities are sufficiently low that the spread in electron velocities is not the limiting factor in determining detector time response.

The time resolution of detector 10' is also degraded by its conical optical system which takes advantage of the conical nature of the wave fronts of the Cherenkov radiation to convert part of the emitted light into parallel rays. With conical optical elements the time response is degraded primarily because the Cherenkov radiation is emitted in lens 38 over a finite surface area. Consider two light rays emitted at the same angle at the same time and in the same plane, defined by the axis and a diameter d on the face 76 of the conical lens 38. As shown in FIG. 11, these rays will not be part of the same wave front because they have different optical path lengths. If the distance between the points at which the light is emitted is d, the difference in path lengths will be equal to:

$$d \sin \theta$$

where $\theta$ is the angle at which Cherenkov radiation is emitted in the medium and $\theta$ is defined by:

$$\cos \theta = 1/\beta n$$

where $\beta = v/c$ and n is the index of refraction of the emitter. The time degradation of the signal introduced by this effect is given by $$\Delta t = dn/c \sin \theta. \qquad (10)$$

For a given index of refraction n and a given $\beta$, $\Delta t$ can be made arbitrarily small by limiting the dimensions of the entrance face of the emitter or by aperturing the X-ray signal so that the irradiated area of the cathode is limited. If the time response is to be degraded no more than 5 picoseconds due to this effect, then for n=1.335 and $\beta = 0.89$ the maximum value for the diameter d of the exposed area on the entrance face 76 of conical emitter 40 is $d=2.08$ mm.

DESCRIPTION OF MULTIPLE SPOT INTENSITY DETECTOR

FIGS. 12 through 14 illustrate an X-ray detector 100 embodying this invention in which like reference numerals refer to the same components as those of detector 10'. Detector 100 has seven cathodes 34' each of which may be of a different thickness or material or both, thereby permitting detection of various segments of the spectrum of X-rays emitted from target 12 as a function of time. Alternatively, each cathode may consist of the same high-Z material and an array of X-ray attenuation filters of various materials would be positioned in front of the multiple cathodes in order to achieve selective spectral sensitivity. If parallel plate 30 of capacitor 32' is too large to easily be made of a single piece of thin foil supported in a ring, a self-supporting metal plate with a separate hole therein for each cathode 34' may be used in lieu of plate 30. A small piece of thin foil could overlie each hole and the surface of the whole plate with the foils fixed thereto would be polished to the desired surface finish. Then the desired X-ray absorbing material for each cathode 34' would be deposited on the thin foils.

For each cathode 34' detector 100 has a corresponding Cherenkov emitter conical lens 38' and collector lens 40' which produces seven separate beams of light with parallel rays leaving detector 100 through exit window 42. The beams of light pass through an array of pinhole spatial filters 43' and are focused into a row of spots 101 at the entrance slit 44 of an image converter camera 45 by an array of seven individually adjustable lenses 46' and seven individually adjustable mirrors 106. When the spots of light entering slit 44 are swept by the image converter camera 45, they produce a series of traces of light representing the intensity as a function of time of various segments of the spectrum of x-rays emitted by fuel pellet 12. The traces of light produced by image converter camera 45 may be amplified or increased in intensity by an image intensifier used in conjunction with such camera and be recorded on sensitive photographic film. When the exposed film is developed, the density of the traces recorded on the film may be read on a microdensitometer.

Figure 15:
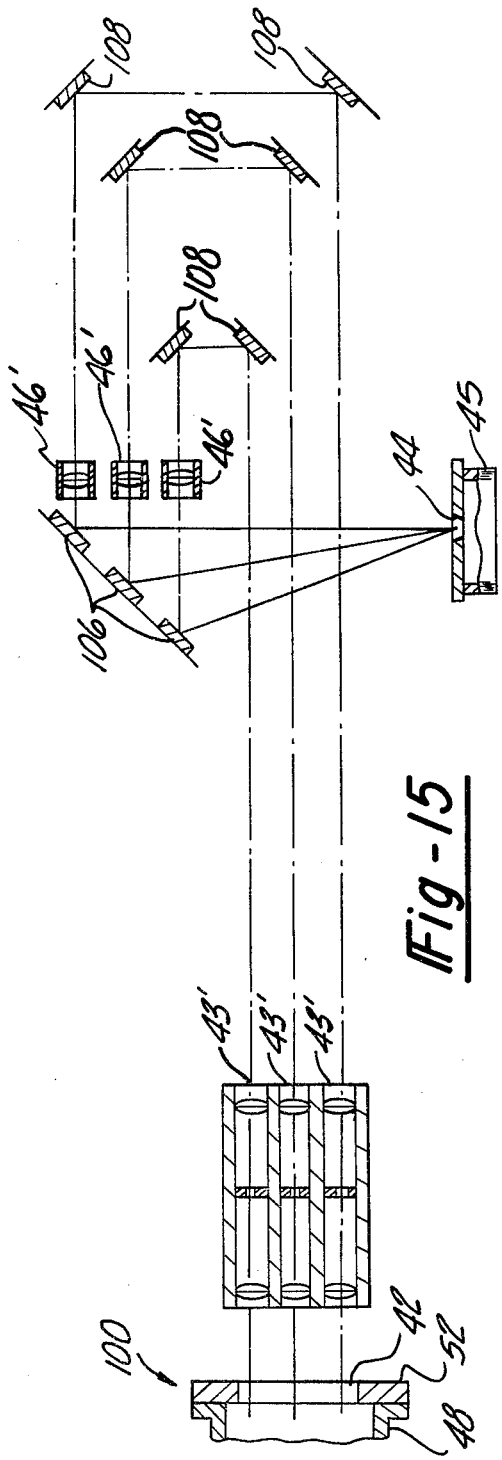
FIG. 15 is a diagram of an optical system for varying the path lengths of differnt beams of light produced by the X-ray detector of FIG. 12 in order to record a longer interval of X-ray emission from the fuel pellet while retaining the same time resolution.

With the same camera sweep time and time resolution, it is also possible to look at a longer interval of time of the x-ray spectrum by varying the path lengths of the different beams. As shown schematically in FIG. 15 for three light beams, the path length of each light beam may be varied by pairs of individually adjustable mirrors 108 located at different distances from mirrors 106. For example, with a suitable array of mirrors 106 and 108, seven identical cathodes 34′, and a total camera sweep time of two nanoseconds, it is possible with detector 100 to look at a 14 nanosecond interval of x-ray emission with picosecond time resolution over the entire 14 nanosecond time interval of the x-ray emission.

DESCRIPTION OF IMAGING DETECTOR

Figure 16:
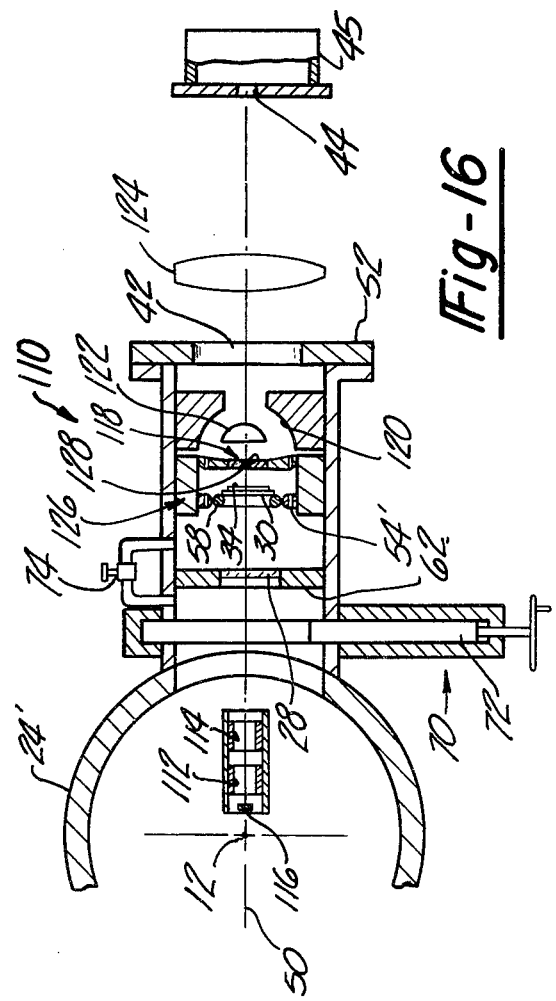
FIG. 16 is a semi-schematic side view in section of a modified X-ray detector embodying this invention producing time resolved images of a fuel pellet emitting X-rays.

FIG. 16 illustrates an x-ray detector 110 embodying this invention which produces time resolved images of fuel pellet 12 when it is emitting x-rays and in which like reference numerals refer to the same components as those of detector 10′. In detector 110 and X-ray image of fuel pellet 12 is produced at cathode 34 by a grazing incidence mirror system (not shown to scale) with a hyperbolic mirror 112, an ellipsoidal mirror 114, and a stop 116 shielding cathode 34 from direct bombardment by X-rays from fuel pellet 12. Such a grazing incidence mirror system is described by R. C. Chase and J. K. Silk in Applied Optics 14, 20 (1975). This X-ray image may also be produced by other means such as a pinhole aperture or a zone plate. The electrons emitted by cathode 34 are accelerated by parallel plate capacitor 32 and bombard a Cherenkov emitter in the form of a thin slab 118 of transparent material. A fraction of the light from thin slab emitter 118 is collected by a low f number double reflecting system of spherical mirrors 120 and 122 arranged and constructed similar to a Burch all-reflecting microscope objective. A lens system which may be corrected for chromatic aberrations is represented by lens 124 which adjusts the size and position of the image at the entrance slit 44 of an image converter camera 45.

Unlike detectors 10′ and 100, the optical collecting and imaging system of detector 110 does not utilize or preserve the conical nature of the wavefronts in which light is emitted by Cherenkov radiation. Rather the optical system of detector 110 treats the light produced by Cherenkov radiation as if it were emitted and propagated in spherical wavefronts of light. Optical systems designed to propagate light in the form of spherical wavefronts are hereinafter referred to as spherical optical systems as opposed to conical optical systems designed to propagate light in the form of conical wavefronts which are hereinafter referred to as conical optical systems. While spherical optical systems cannot convert Cherenkov radiation into a parallel beam of light or focus it to a spot, they can be utilized to reconstruct an image from a source of Cherenkov radiation such as thin slab emitter 118.

As previously noted, the spread in the axial component of the initial velocity of the electrons emerging from cathode 34 degrades the response time of the detector devices. Similarly, the existence of a transverse or perpendicular component of the velocity of the electrons emerging from cathode 34 degrades the spatial or image resolution of detector 110. To improve the image resolution of detector 110, cathode 34 and electron capacitor accelerator 32 may be located inside a solenoid coil 126 which, when energized, decreases the smearing of the image caused by the transverse component of the velocity of the electrons. When energized, solenoid coil 126 produces a magnetic field parallel to the electric field or desired direction of axial acceleration of electrons between parallel plates 30 and 36 of accelerator 32.

This magnetic field decreases the transverse excursion of electrons emitted from cathode 34, thereby improving the spatial or image resolution of detector 110.

The angle $\theta$ at which light is emitted as Cherenkov radiation within thin slab emitter 118 must not exceed the critical angle $\theta_c$ for total reflection or the emitted light will not be able to pass through the exit face 128 of thin slab emitter 118. For light emerging into a vacuum the critical angle $\theta_c$ is given by:

$$\sin \theta_c = 1/n \qquad (11)$$

where n is the index of refraction of thin slab emitter 118. The angle $\theta$ is a function of the relativistic velocity $\beta$ of the electrons emitting the light as defined by equation 1. Therefore, with the thin slab emitter 118 the relativistic velocity of electrons impinging on the emitter must satisfy the requirement that:

$$\frac{1}{n^2} < \beta^2 < \frac{1}{n^2 - 1} \qquad (12)$$

For example, if the index of refraction of thin slab emitter 118 is n=1.5 then the relativistic velocity of the electrons $\beta$ may neither be less than 0.67 nor exceed 0.89.

Equation 12 imposes a restriction on $\beta$ if $n^2 - 1 > 1$ or equivalently $n > \sqrt{2}$. If $n < \sqrt{2}$, the total internal reflection does not impose any restriction on $\beta$. For any given maximum operating voltage for the X-ray detector a value for the index of refraction can be found below which no upper limit will be placed on $\beta$ within the range of operation of the detector. For example, if $V_{max} = 600$ keV, then n=1.5 imposes no operational restriction due to total internal reflection, since no attainable values of $\beta$ exceed 0.89.

The maximum diameter of thin slab 118 of detector 110 is not limited for a given time resolution by equation 10 and is subject only to the much less stringent requirements of equation 5. This is because when a spherical collecting and imaging optical system is used, the rays from all points on the face of the emitter are not superimposed in a focused spot, but are imaged so that rays emitted from different points on the face of the emitter are imaged at corresponding points in the image plane. Becuase the diameter of the detector is not limited by equation 10, the total amount of light produced by a thin slab emitter and spherical optical collecting system can be much greaater than for a conical emitter with the same time resolution for the same intensity of X-rays at cathode 34.

The reconstruction of conical wavefronts produced by Cherenkov emission into a series of spherical wavefronts by a spherical optical collecting and imaging system does, however, cause an inherent degradation of the response time which is independent of the diameter of thin slab emitter 118. The time required for an electron to move a distance $l_1$ through a material with an index of refraction n at a constant velocity $\beta$ is $\Delta t = l_1/\beta c$. During this same time $\Delta t$ a conical wavefront starting from the same point as the electron will propagate a distance $l_2=(c/n)\Delta t$ at an angle $\theta$ relative to the trajectory of the electron. At the end of the time interval $\Delta t$ the conical wavefront of Cherenkov radiation produced by the electron can be approximated by a band of spherical wavefronts of thickness $$\delta = l_1 - l_2 \cos\theta \qquad (13)$$

which produces a smearing of the signal in time of $\Delta\tau = n\delta/c$.

The electrons do not, however, travel at a constant velocity, but slow down as they progress into the medium. This will reduce the width of the band of spherical wavefronts produced by the radiation. Also, most of the electrons will undergo scattering along their path length. Conical optical systems reject most of the light emitted by electrons which have slowed down or undergone large angle collisions, but low f number spherical optical systems will collect and image a large fraction of this light. An upper limit on the time degradation produced using a thin slab emitter with a spherical optical collecting system can be obtained by assuming the photons which are collected are emitted at all angles up to $\theta_c$ where $\sin\theta_c = 1/n$.

An undeflected electron which enters the emitter with an initial energy $E_{max}$ and slows down to an energy $E$ in the emitter traverses a distance $y$ given by $$y(E) = 16.79/D(E_{max}^{1.46} - E^{1.46}) \qquad (14)$$

where D is the material density in mg/cm$^3$ and y is in cm when the energies $E_{max}$ and E are given in hundreds of keV. Equation 14 is derived using the range equation 26 set forth hereinafter. The time required to travel this distance can be obtained from $$t = \int_0^Y dl/\beta c \qquad (15)$$

An electron with an initial velocity $\beta = 0.89$ entering an emitter with an index of refraction $n = 1.5$ emits Cherenkov radiation until it slows down to a velocity $\beta = 0.67$. If the density of the medium $D = 2200$ mg/cm$^3$ the distance traveled by the electron in slowing down will be 0.089 cm from equation 14. The time required for the electron to traverse this distance will be 3.7 psec. A ray of light produced at $t=0$ will travel 0.075 cm in this same time interval. The degradation of the time resolution of the image resulting from the use of a spherical optical collecting system will, therefore, be $\Delta\tau = 1.7$ psec from equation 13.

This is an upper limit on the inherent time degradation resulting from using a spherical optical system to collect light from a slab Cherenkov emitter. In general, light emitted at angles close to $\theta_c$ relative to the optic axis will not be collected because the light rays emerging from the thin slab will miss the collecting mirror 120. Light emitted at small angles relative to the optic axis will be blocked by the back side of mirror 122. Also, most of the electrons will not penetrate the maximum undeflected distance into the emitter while emitting Cherenkov radiation and more radiation will be emitted at the beginning of the electron trajectory when $\beta$ is greatest. All of these factors tend to reduce the inherent time degradation of the detector. The actual degradation of the time response of detector 110 resulting from the reconstruction of Cherenkov emission into spherical wavefronts of light should, therefore, be less than 1 psec.

The light emitted by thin slab emitter 118 may be imaged onto the entrance slit 44 of image converter camera 45 to produce a time resolved streak of a thin slice of the target image. Detector 110 may also be used to take "snapshots" of the implosion phase of fuel pellet 12 if used in conjunction with an electro-optical Kerr cell interposed between a pair of polarizers and controlled by a laser pulse, so that the Kerr cell functions as a shutter controlling the admission of light to a camera with sensitive photographic film. The Kerr cell provides an extremely fast shutter which can be opened for a few picoseconds at a time to permit the photographic film to record images of picosecond segments of the implosion phase of the fuel pellet which would enable detection of instabilities which may develop in the fuel pellet during the implosion phase of the laser fusion process.

Because the contrast ratio of an optically triggered Kerr cell shutter is only about a factor of 1000, light detected during the time the shutter is closed may produce background noise which may reduce the resolution of the snapshot image. If this becomes a problem a fast framing camera may be used to reduce the time interval over which the camera is capable of accepting light but the optical Kerr cell shutter is off.

The light passing through the Kerr cell shutter will be intensified by an image intensifier before being recorded on photographic film. Scattered laser light from the laser pulse triggering the Kerr cell shutter may be prevented from entering the image intensifier by a filter which transmits the light from detector 100 but is opaque at the frequency of the laser light. If the light from detector 110 is of sufficient intensity, a series of picosecond snapshots of the fuel pellet may be taken at different times by using a Kerr cell shutter in conjunction with multibeam optical sampling techniques similar to those described by Vogel, Savage, and Dugay in IEEE Journal of Quantum Electronics 10, 642 (1974). If a series of snapshots is taken, background noise may be subtracted from the images using known computer image enhancement techniques.

Optically triggered Kerr cell shutters will remain open for only a few picoseconds to a few tens of picoseconds. An image converter camera with an image intensifier will be gated on for about one nanosecond at its fastest framing speed and will produce a trace during approximately a two nanosecond interval of time at its fastest sweep speed. Therefore, when cameras with Kerr cell shutters and image converter cameras are utilized in conjunction with X-ray detectors embodying this invention, they must be triggered at precisely the right time in order to record the desired event. If an X-ray detector embodying this invention is utilized with an image converter camera to record an event in a laser driven fusion process, the image converter camera can be triggered by a sub nanosecond electrical signal provided by a fast photo diode monitoring the laser beam irradiating the fuel target. If an X-ray detector embodying this invention is utilized in conjunction with a Kerr cell shutter, the Kerr cell may be optically triggered by a laser pulse picked off from the source of the laser beam irradiating the target by a beam splitter and, if necessary, amplified to actuate the Kerr call. The pulse triggering the Kerr cell can be synchronized relative to the arrival of the laser beam at the target to within better than a few tens of picoseconds by the two photon fluorescence technique.

In addition to synchronization of the laser pulse for triggering a Kerr cell shutter, the pulse must also be of the correct duration in time. Pulses with the necessary picosecond duration for correctly triggering a Kerr cell shutter can be obtained from a mode locked laser oscillator. The mode locked laser oscillator will produce a train of pulses from which a single pulse may be picked off by a pair of Pockles cells. The single pulse may be divided by a beam splitter with one portion being used to irradiate the fuel target and the other portion being amplified and used to trigger the Kerr cell. The portion of the divided pulse used to irradiate the target may be shaped by a device such as a pulse stacker and then amplified to provide a laser pulse having the necessary duration and intensity configuration for proper radiation of the fuel target.

The minimum duration of the divided portion of the pulse for triggering the Kerr cell is dependent on the band width of the light of the divided pulse. Trigger pulses containing a very narrow spread of frequencies have longer durations that trigger pulses containing a broad band of frequencies. In accordance with the Heisenberg uncertainty principle, the minimum duration in time $\Delta t$ of a mode locked laser trigger pulse with a spread in energies $\Delta E$ of the spectral components of the band width is given by:

$$\Delta E \cdot \Delta t > h \qquad (16)$$

where:

h is Planck's constant.

The mode locked pulse from a source such as a YAG laser oscillator is typically on the order of 30 picoseconds full width at half the maximum amplitude of the intensity of the pulse (FWHM). This mode locked pulse may be adquate for triggering a Kerr cell shutter under some conditions when an extremely fast time resolution is not required. To obtain a laser trigger pulse of shorter duration an oscillator producing laser pulses with a larger spread of frequencies must be used. For example, an oscillator with a neodymium doped glass rod will produce a mode locked pulse with a sufficient spread of frequencies of laser light to have a duration of about one picosecond which may be utilized to trigger a Kerr cell shutter. However, this pulse may be of too short a duration for use in a pulse shaping network such as a pulse stacker for producing a laser beam for irradiating the target. Therefore, after using a beam splitter to pick off a suitable portion of a mode locked pulse of short duration for triggering the Kerr cell, the remaining portion of the pulse may be passed through an etalon filter to decrease its spread of frequencies and thereby sufficiently increase its duration so that it may be utilized by the pulse shaping network to produce a laser beam of the desired duration and intensity distribution for irradiating the fuel target.

Detector 110 can be modified to operate like a single spot detector by removing the grazing incidence mirror system to expose the cathode 34 directly to X-rays from the target rather than producing an X-ray image at the cathode and by modifying lens system 124 to produce a reduced image at the entrance slit 44 of image converter camera 45 which is so small that it approximates a spot. This modification of detector 110 can be used to obtain time resolved spectral information from the X-rays by depositing a number of different K edge materials on different areas of cathode 34. A time resolved snapshot of the emitter using a Kerr cell shutter will show different regions of the cathode radiating at different intensities. If the different K edge materials are deposited on the cathode as a series of parallel strips and the Cherenkov signal is focused onto the entrance slit of an image converter camera, then the regions with different cathode materials will produce traces of different intensity as a function of time. This information can be used to determine the shape of the X-ray continuum spectrum produced by the target. Alternatively instead of coating cathode 34 with different K edge materials, the cathode can be coated with a single X-ray absorbing material such as gold and strips of different K edge materials can be placed in front of window 28 so that the X-rays entering the detector have been spectrally filtered before they arrive at cathode 34.

DETERMINATION OF IMAGE RESOLUTION

Without the magnetic field produced by solenoid coil 126 electrons emitted from a point on cathode 34 of detector 110 with a maximum spread in transverse velocities of $1.9 \times 10^9$ centimeters per second, which corresponds to a spread in initial transverse kinetic energies of 1 keV, would degrade image resolution by producing on entrance surface 76 of conical lens 38 of detector 110 a spot, not a point, with a radius of 6.3 $10^{-2}$ centimeters, assuming plates 30 and 36 of the electron accelerator are spaced apart 6 millimeters and an electric field of $10^6$ volts/centimeter. However, if solenoid coil 126 is energized, the magnetic field B produced thereby would reduce the radius r of this spot to:

$$r = 2mv/qB = 1.16 \times 10^{-10} v/B \qquad (17)$$

where:

r is in centimeters v is in centimeters per second, and

B is in kilogauss.

For a transverse velocity of $1.9 \times 10^9$ centimeters per second and a magnetic field of 30 kilogauss produced by solenoid coil 126 the radius of this spot would be reduced to 73 microns. Since the distance an electron travels transverse to optical axis 50 of detector 126 is independent of the image size, increasing the size of the image at the cathode decreases the relative image degradation. For a magnification at cathode 34 of 50x the degradation in image resolution produced by a spot with a radius of 73 microns is less than the degradation of the image inherently produced by the x-ray imaging means whether it be a grazing incidence mirror, a pinhole, or a zone plate. Therefore, solenoid coil 126 may be utilized to effectively decrease degradation of the image by transverse component of the velocity of the electrons emitted from cathode 34 of detector 110 to less than the degradation of the image inherently produced by the x-ray imaging means.

If most of the electrons emitted by cathode 34 have energies of the order of 10 eV or below, then the maximum detectable spread in velocity may be less than a tenth of that calculated above. Without a magnetic field the maximum sized spot produced would have a radius of only 63 $\mu m$ for the detector parameters given above, and with a 30 kg magnetic field a spot of radius 7.3 $\mu m$ would be produced at the entrance face of emitter 118 by the electrons emitted from a point on the surface of cathode 34. This means that if most of the emitted electrons have energies below 10 eV it would be possible to use lower magnification or lower magnetic field strength without reducing the image resolution below that of the x-ray imaging device which produced a focused image of the target at cathode 34.

OTHER FORMS OF CHERENKOV EMITTERS AND OPTICAL SYSTEMS

Figure 17:
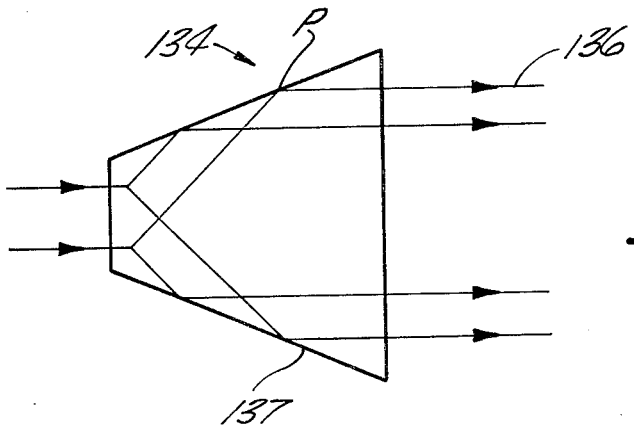
FIG. 17 is a diagram of rays of light emitted as Cherenkov radiation in a conical emitter prism.
Figure 18:
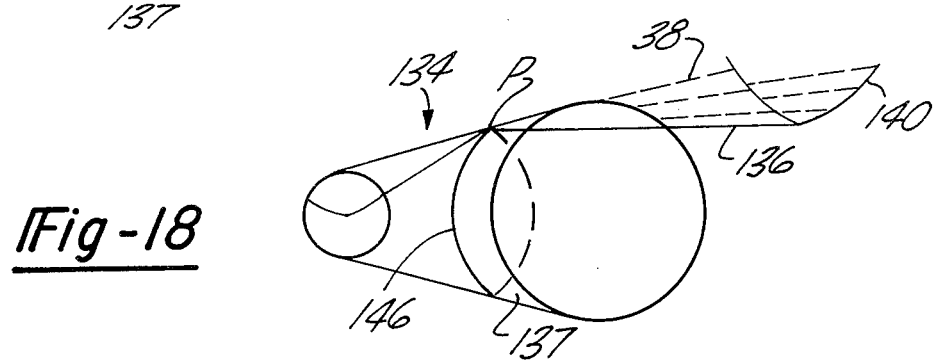
FIG. 18 is a diagram of the locus of all the rays of light leaving a point P on the reflecting surface of a conical prism which were produced by Cherenkov radiation in the prism at an angle $\phi$ to its optical axis.
Figure 19:
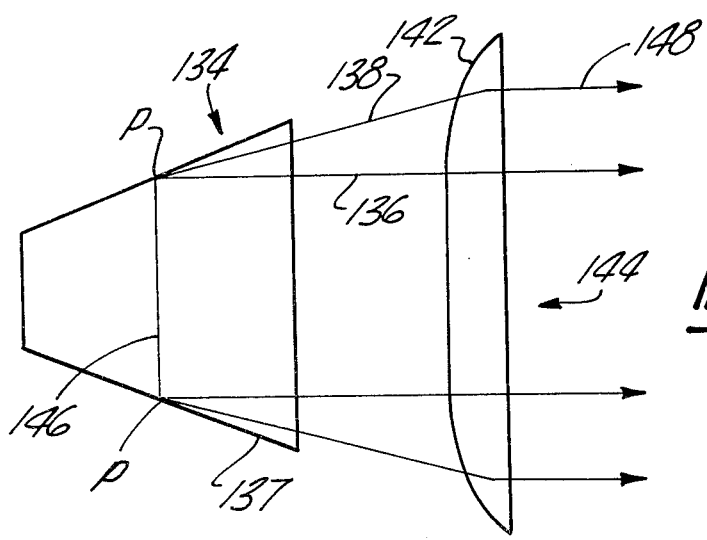
FIG. 19 is a diagram of an optical element refracting the skewed rays of light emitted from the exit surface of the conical emitter prism of FIG. 17 into parallel rays of light.

X-ray detectors embodying this invention which focus the emitted Cherenkov radiation to a spot as in detectors 10' and 100 could utilize conical prisms as Cherenkov emitters rather than conical lenses 38. As shown in FIG. 17, a conical emitting prism 134 will produce parallel rays 136 of emerging light by total internal reflection rather than refraction. If the half angle $\phi'$ of conical prism 134 is equal to $\theta/2$, light rays, emitted at angle $\theta$ in a plane defined by the axis of the conical prism and any radius vector perpendicular to the axis and reflected at a point P in such a plane, will leave the prism parallel to the optical axis. As shown in FIG. 18, light rays 138 reflected at point P which were not emitted in such plane diverge from reflecting point P in an arc 140 which bends away from rather than toward the axis. Consequently, the curvature 142 of a suitable collector lens 144 (FIG. 19) for conical prism emitter 134 is determined by the locus of all simple lens segments which convert the diverging non-parallel rays emitted at each point P on a circle 145 into parallel rays of light 148. Thus, the collector lens 144 used with a conical emitting prism will be similar in shape to the collector lens 40 used with conical emitter 38. The degradation of response time produced by conical prism emitters may be determined from equation 10. Lens 144 may have a diameter many times larger than emitter 134 in order to efficiently collect the diverging rays of light.

Figure 20:
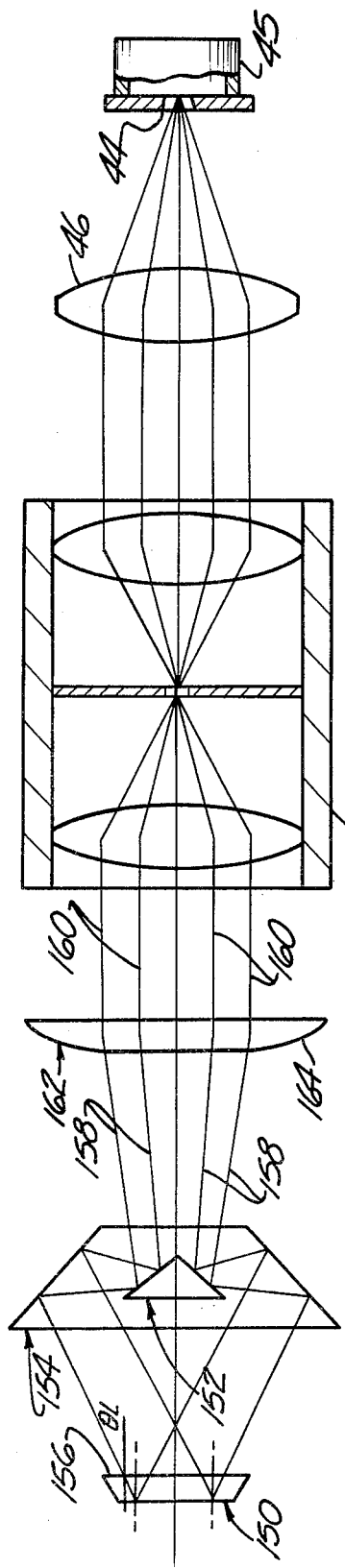
FIG. 20 is a diagram of an optical system utilizing conical mirrors to collect rays of light from a thin slab conical frustrum Cherenkov emitter.

As shown in FIG. 20, in spot detectors the Cherenkov radiation can be emitted and collected in conical wavefronts by a thin slab conical frustum emitter 150 and a system of conical mirrors. If the index of refraction n of thin slab emitter 150 is greater than $\sqrt{2}$, equation 12 restricts the maximum permissible electron velocity $\beta$ in the same way as a thin slab emitter used with a spherical optical system. The light from thin slab emitter 150 is collected by conical mirrors 152 and 154 which are arranged and designed to reflect into parallel rays light emitted in slab 150 at an angle $\theta$ relative to the optical axis and in a plane defined by the optical axis of the slab and a radius vector perpendicular to the axis of the slab. If the half angle of mirror 152 is $\phi$ and the light rays emerge from the exit face 156 of the slab at an angle $\theta_L$ corresponding to Cherenkov emission at angle $\theta$, the light emitted in such plane will be reflected into parallel rays if the half angle of conical mirror 154 is equal to $\phi - \theta_L/2$. Light rays 158 emitted at an angle $\theta$ relative to the optical axis but not emitted in these planes will be reflected in off-axis conical arcs as in the case of conical lenses 38 and conical emitter prism 134. A fraction of these off-axis rays 158 may be converted into parallel rays 160 by a collector lens 162. The curvature of optical surface 164 of lens 162 is determined by the locus of all simple lens segments which convert the off-axis rays into parallel rays as in the case for lenses 40 and 144 and has a similar shape. The rays of light emerging from collector lens 162 may be spatially filtered by a pinhole filter 43 and focused to a spot at the entrance slit 44 of an image converter camera 45 by a simple lens system 46.

Figure 21:
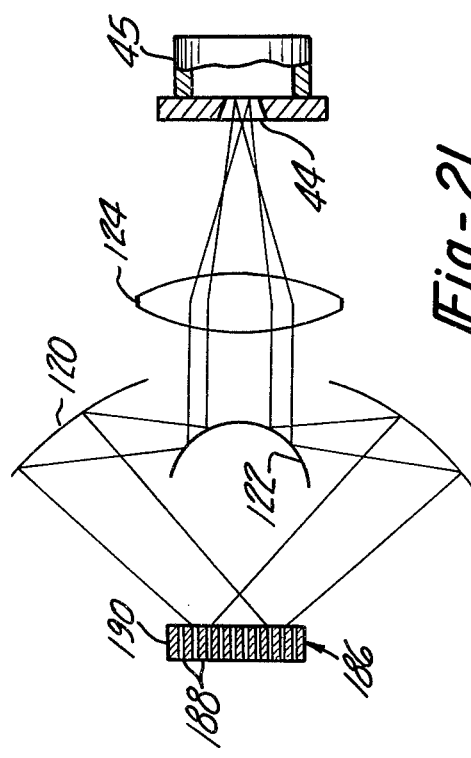
FIG. 21 is a diagram of an optical system with a double reflecting mirror and lens system for reconstructing an image of a fuel pellet from the rays of light emitted by a fiber optic plate Cherenkov emitter and focusing the image on the entrance slit of an image converter camera.

As shown in FIG. 21, a fiber optic plate 186 may be used as a Cherenkov emitter with a spherical optic collecting system in imaging detectors embodying this invention. The light transmitted from fiber optic plate 186 can be collected by spherical mirrors 120 and 122 and focused by a lens system 124 onto the entrance slit 44 of an image converter camera 45. Fiber optic plate 186 may produce a sharper image than that produced by thin slab conical frustum 150 because the object plane is well defined at the exit face of plate 186.

Figure 22:
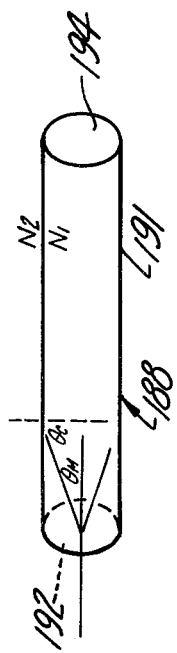
FIG. 22 is a perspective view of one of the optical fibers of the fiber optic plate Cherenkov emitter of FIG. 21.

Plate 186 has an array of a plurality of transparent fibers 188 with a higher index of refraction $n_1$ embedded in an opaque cladding 190 with a lower index of refraction $n_2$ so that the side wall 191 of each fiber is engaged by the cladding and the entrance and exit faces 192 and 194 of each fiber are exposed. Since light is transmitted through fibers 188 of plate 186 by total internal reflection, there is a maximum half angle $\theta_m$ for Cherenkov emission of light by undeflected electrons which must not be exceeded if the light is to be transmitted through the fibers of the fiber optic plate 186. It will be apparent from FIG. 22 that for an undeflected electron the maximum half angle $\theta_m$ of a cone of light which will be transmitted through the fibers 188 of plate 186 is:

$$\theta_m = \pi/2 - \theta_c \tag{18}$$

where:

$\theta_c$ is the mimimum angle of incidence for total internal reflection of light along the fiber.

The minimum angle $\theta_c$ for total internal reflection is given by:

$$\sin \theta_c = n_2/n_1 \tag{19}$$

where:

$n_1$ is the index of refraction of the fiber, and $n_2$ is the index of refraction of the cladding.

As previously indicated, equation 1 defines the cone half angle $\theta$ at which light is emitted as Cherenkov radiation as a function of the velocity of the electrons in fibers 188 and the index of refraction thereof as follows:

$$\cos \theta = 1/n_1 \beta$$

Thus, substituting equations 19 and 1 into equation 18 defines the maximum permissible velocity $\beta$ of an undeflected electron which will result in transmission in fibers 188 by total internal reflection by side walls 191 of the light emitted therein by the electron as:

$$\beta < 1/n_2 \tag{20}$$

For internally reflected light to be transmitted through exit face 194 of fibers 188 the velocity $\beta$ of the electron must also comply with the restriction of equation 12 that:

$$\frac{1}{n_1^2} < \beta^2 < \frac{1}{n_1^2 - 1}$$

Therefore, if $$n_1^2 < n_2^2 + 1 \tag{21}$$

equation (20) will determine the upper limit of the electron velocity in fibers 188 of plate 186 for which Cherenkov radiation can be transmitted; and if $$n_1^2 > n_2^2 + 1 \qquad (22)$$

equation 12 will determine the upper limit of the electron velocity in the fibers of the plate. For example, if $n_1 = 1.5$ and $n_2 = 1.3$, the electron velocity $\beta$ is limited by equation 20 and may not exceed 0.769; and if $n_1 = 1.7$ and $n_2 = 1.3$, equation 12 will determine the upper limit of the electron velocity $\beta$ which may not exceed 0.727.

The degradation of the time resolution due to reconstruction of conical wavefronts into spherical wavefronts is the same as for a thin slab emitter if relation 22 holds. If relation 21 holds then $$\delta = l_1 - l_2 \sin \theta_c$$
$$= l_1 - l_2 n_2/n_1$$

where $l_1$ and $l_2$ are defind as in equation 13 and the degradation in the time response is given by $\Delta\tau = n_1 \delta/c$. For example, if $n_1 = 1.5$, $n_2 = 1.3$, the density of emitter material $n_1$ is 2200 mg/cm$^3$ and the initial electron velocity $\beta = 0.769$, then $l_1 = 0.0182$ cm, $l_2 = 0.0174$ cm and $$\Delta\tau = 0.16 \text{ psec}$$

compared with a time degradation of 1.7 psec for a thin slab emitter with index of refraction $n_1$. The reduction in time degradation is achieved at the expense of intensity since the maximum permissible electron velocity is reduced.

The various systems described herein may be refined and optimized by the use of known three dimensional ray tracing and computer optimization techniques. The optical systems utilized in detector devices embodying this invention should be corrected by known techniques for the most detrimental of the various aberrations such as chromatic aberrations, spherical aberration, coma, astigmatism, curvature of field, and distortion. The optical collecting systems may be corrected for chromatic aberration over a range of frequencies by known optical design techniques so that a larger fraction of the light emitted by Cherenkov radiation can be focused onto the entrance slit 44 of image converter camera 45. For optimum detector performance, the optical system as a whole must be designed to reduce chromatic aberration and produce maximum intensity. This requires the use of three dimensional computer ray tracing techniques. Computer programs employing these techniques are commercially available and can be used to optimize the design of the optical system.

MATERIALS FOR EMITTERS AND OPTICAL COMPONENTS

As will be shown, restrictions imposed by time resolution in conical emitters, total internal reflection for thin slabs and fiber optics plates, and light losses to the cladding in fiber optic plates limit the choice of materials that can be used to obtain efficient production and collection of Cherenkov radiation in the x-ray detectors described in this disclosure. Because the intensity of Cherenkov radiation increases as the wavelength of the emitted light decreases, materials used for the emitter and transparent elements of the optical system should be good transmitters of soft ultraviolet radiation. Some of the materials which satisfy this requirement are the fluorides, NaF, LiF, CaF$_2$, and MgF$_2$, and fused silica glass.

For conical emitters there is a range of indices of refraction between 1.3 and 1.5 for which emission of Cherenkov radiation will be maximuzed for the electron energies typically generated in this device. The collectable Cherenkov emission is also dependent on the undeflected path length of electrons in the material. The range of electrons in a material is approximately inversely proportional to material density and undeflected range increases as the atomic number of the emitting material decreases. Therefore, some low density, low atomic number materials may be superior materials for conical emitters even if their indices of refraction are outside the optimum range.

In spherical optical systems degradation of the time resolution does not restrict the index of refraction of the emitting material for time resolution on the order of 1 psec or greater. However, the value of the index of refraction of the emitter material may place a restriction on the maximum value for $\beta$ for a given configuration. For example, for thin slab emitter 150, if $n > \sqrt{2}$ then $\beta$ is limited by equation 12. For a given maximum value of $\beta$, the emitter material should be chosen with as high an index of refraction as possible consistent with efficient collection of the emitted light by a low f number optical system. Materials such as CaF$_2$ and fused silica are believed to be good choices for thin slab emitters for spherical optical systems.

If a fiber optic plate is used as an emitter, it may be necessary to specially fabricate the plate in order to obtain the desired indices of refraction for both the fibers and the cladding. Commercially available fiber optic plates generally have high indices of refraction for the fibers, which limit the permissible value of $\beta$, or relatively small differences between the index of refraction of the fibers and the cladding which also limit the permissible value of $\beta$. However, ultraviolet transmitting fiber optic plates with fused silica fibers with an index of refraction of about 1.5 have recently been developed and are believed to be suitable for use in detectors embodying this invention. The material used for the cladding in any fiber optic plate should if possible be optically absorbing in the spectral region over which Cherenkov radiation is collected by the optic system and have as low an index of refraction as possible. If the emitter is supported in a cryogenically cooled mount, it is believed a fiber optic plate with fused silica fibers and cladding of solid water (H$_2$O) could be used. To make the cladding of water opaque, a light absorbing dye could be dissolved in the water. For a fiber optic emitter with fused silica fibers ($n_1 \sim 1.5$) and a cladding of solid cryogenically cooled H$_2$O ($n_2 \sim 1.22$) the value of $\beta$ will be restricted to not more than 0.82.

Since the intensity of Cherenkov radiation increases with decreasing wavelength of the emitted light, the emitters and optical systems of the detectors could be designed to optimize the emission and collection of Cherenkov radiation in the ultraviolet portion of the spectrum. If the emitter and all lenses and windows used in the optical system are made of ultraviolet transmitting materials, the detector can then be optimized to produce shorter wavelength radiation in the ultraviolet and near ultraviolet portions of the spectrum. An optical system designed to detect vacuum ultraviolet radiation must be completely contained in a vacuum system. If the fast optical detector is an image converter camera, the phototube of the camera would be sealed to the vacuum system containing the optical system. The phototube would also be specially designed with an entrance window which transmits ultraviolet radiation and a photocathode which is chosen to have a high sensitivity to ultraviolet radiation in the spectral region that the optical system is designed to transmit. Several materials are known which transmit ultraviolet radiation and can be used to fabricate optical elements. Some of these are NaF, LiF, $CaF_2$, $MgF$, fused silica, and crystal quartz.

Although the total quantity of light from the detector can be increased by optimizing the optical system to detect radiation in the ultraviolet and near ultraviolet region of the spectrum, there are factors which reduce the benefits to be obtained from so doing. The indices of refraction of all emitter materials increase with decreasing wavelength of the emitted light. This means that the diameter of the face of a conical emitter lens must be somewhat smaller for an optical system which is designed to transmit ultraviolet radiation than for an optical system which is designed to operate at visible wavelengths. Dispersion also increases as wavelength decreases and the band of frequencies which can be effectively corrected for chromatic aberration may be narrower in the ultraviolet region of the spectrum than at visible wavelengths.

RADIANT FLUX AND INTENSITY OF LIGHT

The radiant flux and intensity of the light produced by the x-ray detectors must be sufficient to be detected by the photodetector which may be an image converter camera 45. In general, the intensity of this light is dependent on the quantity and spectral distribution of the x-rays from fuel pellet 12 impinging on the cathode of the detector, the quantity of the electrons emitted by the cathode, and the efficiency of the optical system in collecting and focusing the light from the Cherenkov emitter.

The quantity of electrons produced by cathode 34 may be maximized for a given spectral distribution of x-rays emitted from fuel pellet 12 by selectrion of an appropriate material for the cathode and the thickness of the cathode. The appropriate material and thickness can be determined from the well-known relations for x-ray absorption as a function of x-ray energy and atomic number of the absorber material, from the relationships for electron range in different materials as a function of electron energy, and from the relations for the production and escape of electrons from a surface of a material as a result of bombardment of the material by x-rays (for example, see G. F. Dionne, Effects of Secondary Electrons Scattering on Secondary Emission Yield Curves, Journal Applied Physics Vo. 44, No. 12, page 5361, December 1973). Using these relations, calculations may be made by known computer optimization techniques to determine the optimum material and cathode thickness for a given x-ray spectral distribution. Typical thickness for cathode 34 is on the order of a few thousand angstroms or less and typical optimized conversion efficiencies are on the order of one to ten percent depending on the spectrum of x-rays incident on the cathode.

For a given flux of electrons from cathode 34 the maximum number of photons of light produced by Cherenkov radiation will be dependent on the velocity of the electrons, the index of refraction of the emitter, and the area bombarded by electrons at the entrance end of the emitter. The theory of Cherenkov radiation by Frank and Tam as set forth in *Nuclear Physics* by W. E. Burcham, McGraw Hill Publishing Co., 1965, at pages 159–161 shows that the rate of energy lost by a single charged particle due to Cherenkov radiation is given in cgs units by:

$$\frac{dE}{dx} = \frac{4\pi^2 z^2 e^2}{c^2} \left(1 - \frac{1}{\beta^2 n^2}\right) v dv \tag{24}$$

where:
 E = the energy radiated by Cherenkov emission
 z = the number of charge units of the moving particle, which is 1 for an electron
 e = the magnitude of the charge of the particle which for an electron is $4.8 \times 10^{10}$ statcoulombs,
 $v$ = the frequency of the radiation.

Equation 24 defines the energy loss due to Cherenkov emission of a charged particle such as an electron for all frequencies at which Cherenkov radiation is emitted by the particle. However, only a limited range of frequencies of the emitted light will actually be collected by the optical system. The intensity of emitted Cherenkov radiation increases with decreasing optical wavelengths, but ultraviolet radiation may be reabsorbed in the emitting material and, therefore, it is not collected. The intensity of emitted Cherenkov radiation, therefore, peaks in the blue or near ultraviolet portion of the spectrum depending on the emitting material used. Furthermore, the optical collecting system can only be designed to collect light from the emitter in a limited range of frequencies usually chosen near the frequency of peak intensity of the light leaving the emitter. Even if the optical system is corrected for chromatic aberration, it still is only corrected for a finite range of frequencies, say between the frequencies of red and blue light.

The number of photons of light produced in the emitter per electron can be calculated by integrating equation 24 over the range of wavelengths from $\lambda_1$ to $\lambda_2$ in which Cherenkov radiation is expected to be detected, where wavelength refers to the vacuum wavelength for a given frequency of light. For photon wavelengths between $\lambda_1$ and $\lambda_2 [\lambda_2 > \lambda_1]$ the number of photons of light N produced by a single electron traveling a distance l at a velocity $\beta$ in a medium with an index of refraction n is given by:

$$N = \frac{4\pi e^2}{hc} l [1 - \frac{1}{\beta^2 n^2}][\frac{1}{\lambda_1} - \frac{1}{\lambda_2}] \tag{25}$$

where Planck's constant h is $6.63 \times 10^{-27}$ erg seconds. For example, an electron moving at a constant velocity $\beta = 0.89$ in a transparent emitter medium with an index of refraction n = 1.335 would produce by Cherenkov radiation about 17.8 photons of light per millimeter with vacuum wavelengths in the range between 3,000 to 5,000 angstroms.

The path length l of an undeflected electron in an emitter during the time the electron emits Cherenkov radiation may be determined from the difference between the maximum undeflected electron range and the undeflected electron range at which the electron stops emitting Cherenkov radiation. The maximum undeflected range as a function of the kinetic energy $E_k$ of electrons in materials has been measured and to a good approximation is independent of the particular material through which the electron passes when the ranges are expressed in mg/cm². An approximate formula for the maximum undeflected range R of an electron as a function of the kinetic energy $E_k$ of an electron is:

$$R = 16.79 E_k^{1.46}$$

where R is in mg/cm² and $E_k$ is in hundreds of keV. From equation 9 an expression of the kinetic energy $E_k$ of the accelerated electron as a function of its velocity $\beta$ may be derived as:

$$\beta^2 = 1 - \left(\frac{E_o}{E_k + E_o}\right)^2 \quad (27)$$

where $E_o$ is the rest mass of the electron which is 511 keV.

Utilizing equations 26 and 27 and knowing the density of the transparent material through which the electron passes, the undeflected path length l may be calculated. For example, if NaF with an index of refraction of n ~ 1.335 in the spectral region of interest and a density of 2.558 g/cm³ is chosen as the emitter, then Cherenkov radiation will be emitted for values of $\beta$ of 0.75 and above. If the velocity $\beta$ of an electron upon entering into and moving through the emitter is reduced from $\beta = 0.89$ to $\beta = 0.75$, then the undeflected path length l of the electrons will be 167 mg/cm³ which for NaF is 0.65 mm. However, most of the electrons will not traverse the entire path length l without being deflected by large angle scattering. The lower the atomic number Z of the transparent material the longer the mean free path length $l_m$ before large angle scattering takes place. Thus, the lower the atomic number of the emitter material the larger the fraction of emitted photons of light which exit from the emitter for collection and focusing by the optical system. This effect is greater for conical collecting systems than for spherical collecting systems, because conical systems reject most of the light produced by electrons which have slowed down or undergone large angle collisions while spherical systems collect a large fraction of this light. It is, therefore, reasonable to expect that spherical optical systems would be at least an order of magnitude more efficient in collecting emitted light than conical optical systems.

An expression for the total number of photons of light N produced by Cherenkov radiation in a given frequency range can be derived from equations 24, 26, and 27. From equation 24 the differential of the number of photons of light per electron dN may be expressed as:

$$dN = \frac{4\pi^2 e^2}{hc^2}\left(1 - \frac{1}{\beta^2 n^2}\right) d\nu\, dx, \quad (28)$$

and from equation 26 an expression for dx as a function of the range R of undeflected electrons and the density D of the emitting material in mg/cm³ may be derived as:

$$x = \frac{R}{D} = 16.79 \frac{E^{1.46}}{D} \quad (29)$$

$$dx = 24.5 \frac{E^{0.46}}{D} dE$$

If equations 27 and 29 are substituted into equation 28, the number of photons N emitted per electron in a given frequency range $d\nu$ can be expressed as:

$$N = \frac{98\pi^2 e^2}{hc^2 D}\left[\int\left(1 - \frac{1}{n(\nu)^2\left[1 - \left(\frac{5.11}{5.11 + E_k}\right)^2\right]}\right) E_k^{0.46} dE_k\right] d\nu \quad (30)$$

The integration over the variable $E_k$ of equation 30 goes from the kinetic energy of the electron upon initially entering the emitting material to the kinetic energy at which the electron ceases emitting Cherenkov radiation for which $\beta = 1/n$. From equation 27 this lower energy level at which the electron ceases emitting Cherenkov radiation is:

$$E_k = \left(\frac{n}{\sqrt{n^2 - 1}} - 1\right) 5.11 \quad (31)$$

where $E_k$ is in hundreds of keV's. To obtain the total number of photons of light emitted by Cherenkov radiation in the frequency range which can be detected by a photodetector such as image converter camera 45 after the light has passed through the optical system, equation 30 must be integrated over such a range of frequencies. In equation 30 the index of refraction of the emitter material is not assumed to be constant but may vary with the frequency of the light emitted therein by Cherenkov radiation. It the emitter material is NaF with a density of 2.558 g/cm³ and the average value of the index of refraction [N=1.335] is used in the integral, then the solution of equation 30 indicates that 6.8 photons of light per electron will be emitted in the range of 3,000 to 5,000 angstroms for an electron with an initial velocity $\beta = 0.89$. If the emitter material is fused silica with an average index of refraction of 1.45 and a density of 2.20 g/cm³, then the solution of equation 30 indicates that 16.2 photons of light per electron will be emitted in the range of 3,000 to 5,000 angstroms for an electron with an initial velocity of $\beta = 0.89$.

The efficiency of the optical system in collecting and focusing the light from the emitter will be primarily dependent on the particular design thereof and may range from less than 1 percent to more than 10 percent. The range of wavelengths of light collected by the optical system will affect the intensity of the light received by the photodetector such as image converter camera 45. For a conical optical system which has not been corrected for chromatic aberrations, the wavelengths collected will lie in a narrow band around the wavelength of peak intensity of the emitted light. If a conical system is corrected for chromatic aberrations using known optical design techniques or if a spherical optical collecting system is used which has been corrected for chromatic aberrations, the range of frequencies collected will be greater, and hence, the amount of light collected will be greater.

Considering only those parameters of equation 30 which can be varied in constructing an x-ray detector, the number of photons of light N produced in an emitter for a given flux of electrons and a given initial value of $\beta$ is proportional to:

$$N \propto \frac{d^2}{D}\left(\frac{1}{\lambda_1} - \frac{1}{\lambda_2}\right) \int\left(1 - \frac{1}{n^2\beta(E_k)^2}\right) E_k^{0.46} dE_k \quad (32)$$

where d is the diameter of the face of the emitter and n is assumed to be constant having a value equal to the average value of n in the interval $\lambda_2 - \lambda_1$. The integration is performed from the electron kinetic energy for which $\beta = 1/n$ given by equation 31 to the initial energy with which electrons enter the emitting material.

By using equation 1, which defines the angle at which light is emitted by Cherenkov radiation, to rewrite equation 10, which defines the time degradation produced by a conical optical system; the diameter d of the entrance face of the conical emitter may be defined as:

$$d = \frac{c}{n} \Delta t \left(1 - \frac{1}{\beta_{max}^2 n^2}\right)^{-\frac{1}{2}} \quad (33)$$

which when substituted into relation 32 gives:

$$N \propto \frac{1}{D}\left(\frac{c\Delta t}{n}\right)^2 \left[1 - \frac{1}{n^2\beta_{max}^2}\right]^{-1} \left[\frac{1}{\lambda_1} - \frac{1}{\lambda_2}\right] \int\left(1 - \frac{1}{n^2\beta(E_k)^2}\right) E_k^{0.46} dE_k \quad (34)$$

$$\propto \frac{c^2\Delta t^2}{D}\left[\frac{1}{\lambda_1} - \frac{1}{\lambda_2}\right] Q$$

The quantity Q, defined by $$Q = \frac{1}{n^2}\left[1 - \frac{1}{n^2\beta_{max}^2}\right]^{-1} \int\left(1 - \frac{1}{n^2\beta(E_k)^2}\right) E_k^{0.46} dE_k$$

has been calculated for various values of n and initial values $\beta_{max}$ and is given in the table below. For the calculated values $E_k$ was in units of hundreds of keV.

| n | | | Q | | |
|---|---|---|---|---|---|
| β | 1.2 | 1.3 | 1.4 | 1.5 | 1.6 |
| .667 | | | | 0 | .077 |
| .714 | | | 0 | .142 | .212 |
| .769 | | 0 | .290 | .442 | .442 |
| .833 | 0 | .600 | .892 | 1.00 | .813 |
| .850 | .322 | .971 | 1.24 | 1.37 | .999 |
| .890 | 1.63 | 2.36 | 2.55 | 2.50 | 1.63 |

The above table shows that for $\beta = 0.89$ the contribution of the factor Q to Cherenkov radiation production in a conical lens emitter peaks for indices of refraction in the range 1.3 to 1.5. Total Cherenkov radiation production for a given material will depend both on Q and on the material density D. The following table gives the quantity Q/D for several emitter materials for $\beta = 0.89$.

| Material | n | D | Q/D |
|---|---|---|---|
| NaF | 1.335 | 2.558 | .997 |
| LiF | 1.45 | 2.60 | .973 |
| CaF$_2$ | 1.445 | 3.18 | .796 |
| SiO$_2$ | 1.45 | 2.20 | 1.14 |

This table shows that all the emitter materials produce about the same quantity of Cherenkov radiation within a range of ± 20% with fused silica (SiO$_2$) being somewhat better than the other materials because of its lower density. NaF, LiF, CaF$_2$, and fused silica were chosen as examples because they have good transmission properties for ultraviolet radiation. Other materials might produce more collectable light if they are lower density and are composed of lower atomic number elements in addition to having acceptable transmission properties in the soft ultraviolet region of the spectrum.

The diameter of a thin slab emitter or fiber optic plate used with spherical collecting optics is not limited by equation 10. For a thin slab smitter 150 used with spherical collecting optics or a fiber optic plate emitter 186 used with spherical collecting optics under the conditions of relation 22, relation 32 determines the relative number of photons produced. Relation 12 imposes a limit on the value of the kinetic energy which can be used as the upper bound for the integral in relation 32 for values of $n < \sqrt{2}$.

The greatest signal intensity will be produced in a thin slab emitter by operating at the highest value of $\beta$ that the detector is designed to achieve, $\beta_{max}$, and by using the largest value of n that satisfies the right hand side of relation 12, i.e., $$n_{max} = \left(1 + \frac{1}{\beta_{max}^2}\right)^{\frac{1}{2}}.$$

Lower values of n will lower the total emission of light because, for a given $\beta$ and diameter d, fewer photons are produced per electron as n decreases. Higher values of n will lower total emission of light because $\beta$ must be reduced which again reduces the number of Cherenkov photons per electron. For example, in a detector where the potential between the plate of the oscillator can be as high as 600keV, $\beta_{max} = 0.89$ and $n_{max} = 1.5$. In practice it may be necessary to use somewhat lower values of $\beta$ or n to efficiently collect the light with low f number collecting optics.

For a fiber optic plate emitter 186 used with a spherical optical system under the conditions of relation 21, relation 32 also determines the number of photons produced, but the upper limit on electron kinetic energy is determined by relation 20 which imposes a lower value for the upper bound on the integral of relation 32 than is imposed by relation 12. When relation 12 applies, the intensity of the light that can be obtained from a fiber optic plate emitter will always be lower than the maximum intensity of the light that can be obtained from a thin slab emitter made from the same material as the fibers. This is because the number of photons per electron will be smaller since $\beta$ is smaller. However, the image resolution is improved because the image plane of a fiber optic plate emitter is better defined than with a thin slab emitter.

The maximum diameter d of the entrance surface of both the thin slab and fiber optic emitters is limited only by the constraint imposed by equation 5 on the maximum diameter of the cathode for a given degradation of response time. Hence, the thin slab and fiber optic emitters when used with spherical collecting optics may be constructed with a larger diameter entrance surface to produce more light by Cherenkov radiation than conical emitters with the same time resolution.

The light collected from the emitter and focused onto a photodetector such as image converter camera 45 by the optical system must be of sufficient intensity to excite the photodetector. An image converter streak camera with an image intesifier, commercially available from John Hadland, Photographic Limited, Newhouse Laboratories, Bovington, Herts, England as model Imacon 675 has a photocathode therein and is sensitive enough to detect a single photoelectron emitted from such photocathode. The Imacon 675 camera can be supplied with a photocathode which converts into photoelectrons about 30 percent of the photons of light in the spectral range in which Cherenkov radiation is transmitted by the optical system of the x-ray detector. One photocathode for the Imacon 675 camera which gives this efficiency is a bialkali K-Cs-Sb material which has an RCA spectral response designation of 133. The Imacon 675 camera has a resolution of 6 line pairs per millimeter and when used in the sweep mode, a maximum sweep speed of the electron beam of the image intensifier of 35 mm/nanosecond which is equivalent to a time resolution of better than 5 picoseconds. The minimum spot size produced by the image intensifier for a single photoelectron emitted from the camera photocathode is about 62.5 $\mu$m in diameter. The intensity of light from the spot is sufficient to produce a film density of one on ASA 3,000 speed film at the highest gain of the image intensifier. Thus, at its fastest sweep speed and maximum gain, the Imacon 675 camera with image intensifier requires $1.4 \times 10^3$ photons/nanosecond focused to a spot on the photocathode of the camera to produce a streak with a width of 62.5 $\mu$m and an average film density of one on ASA 3,000 speed film. For the Imacon 675 camera with image intensifier to produce at its fastest sweep speed and maximum gain a streak with a width of 0.5 cm and an average film density of one on SAS 3,000 speed film requires a flux of $8.4 \times 10^4$ photons/nanosecond on the photocathode of the camera.

If x-ray detectors 10' and 110 are used to diagnose the x-ray emission from a laser driven fusion pellet, it is believed these detectors should be responsive to x-ray flux levels as low as one joule per nanosecond into $4\pi$ steradians. If cathode 34 of detector 10' has a diameter of 2.08 mm and is located 50 cm from a fuel pellet 12 which emits x-radiation of one joule per nanosecond into $4\pi$ steradians with an average x-ray photon energy of 2 keV, then the number of photons impinging on cathode 34 will be $3.1 \times 10^9$ photons/nanosecond. If cathode 34 has an efficiency of 1 percent for converting the photons of x-rays to emitted electrons, then the number of electrons emitted from cathode 34 will be $3.1 \times 10^7$ electrons/nanosecond. If conical emitter 38 is made of NaF with an average index of refraction of 1.335 in the spectral range of interest and a density of 2.558 g/cm$^3$ and the initial veoocity $\beta$ if electrons striking the emitter is 0.89, then each electron will produce about 6.8 photons of Cherenkov radiation in the range between 3,000 to 5,000 angstroms for a total of $2.1 \times 10^8$ photons/nanosecond. If 1 percent of these photons of emitted light is collected and focused by the conical optical system onto a spot with a diameter of 50 $\mu$m on the photocathode of the Imacon 675 camera, then $2.1 \times 10^6$ photons/nanosecond of light will be focused to essentially a point on the photocathode of the image converter camera. This is about 1500 times more light than is required by the Imacon 675 camera with image intensifier to produce a film density of one on ASA 3,000 speed film at the fastest sweep speed and highest gain of the camera. Thus, the intensity of the light produced by a single spot intensity detector 10' embodying this invention is more than adequate to be detected and may need to be attenuated.

If a grazing incidence mirror is used to produce an image on cathode 34 of image detector 110, the amount of x-ray energy reaching the cathode will be at least an order of magnitude less than for direct illumination of the cathode by the x-ray source as in detector 10'. If grazing incidence mirrors image an x-ray flux of $5 \times 10^8$ photons/nanosecond onto cathode 34 and the cathode conversion efficiency to electrons is 1 percent, then $5 \times 10^6$ electrons/nanosecond will be ejected from cathode 34. If thin slab emitter 128 is made of fused silica with an average index of refraction of 1.47 in the spectral range of 3,000 to 5,000 angstroms, the fused silica has a density of 2.20 g/cm$^3$ and the initial velocity $\beta$ of electrons striking the cathode of 0.89, then each electron will emit an average of 16.2 photons of Cherenkov radiation in the range between 3,000 and 5,000 angstroms for a total Cherenkov emission of $8.1 \times 10^7$ photons/nanosecond of light. If 20 percent of these photons of light are collected and imaged by the low f number spherical optic system of detector 110 to produce a 0.5 cm image on a 50 $\mu$m wide entrance slit 44 of the Imacon 675 camera, then about $2 \times 10^5$ photons/nanosecond will be imaged onto the photocathode of the camera 45. Since this is greater than the $8.4 \times 10^4$ photons per nanosecond of light required by the Imaco 675 image converter camera to produce a streak of average film density of one on ASA 3,000 speed film, the signal intensity produced by image detector 110 will be adequate for use at an x-ray flux level of one joule/nanosecond into $4\pi$ steradians with cathode 34 of the detector located 50 cm from the target.

The intensity of the light produced by detectors embodying this invention may also be increased by positioning cathode 34 closer to fuel pellet 12. X-ray intensity increases as the inverse square of the distance from the target decreases for direct illumination of the cathode 34 by the target. Moreover, the intensity of the light produced by detectors embodying this invention may be increased at the expense of time resolution. For example, instead of sweeping an Imacon 675 camera with intensifier at its fastest speed of 35 milliliters per nanosecond which can give a resolution of a little better than 5 picoseconds, the camera could be swept at half this speed to give a resolution of 10 picoseconds with twice the signal intensity. Similarly, with two dimension "snapshots" using a Kerr cell optical shutter, the average signal intensity will be directly proportional to the amount of time the shutter stays open.

While at least some of the detectors embodying this invention are capable of detecting x-ray fluxes as low as one joule per nanosecond into $4\pi$ steradians, it is believed laser fusion targets which produce nuclear yields on the order of the laser energy with which they are irradiated will emit considerable greater x-ray fluxes. The peak emission from such targets is expected to be as high as one joule per ten picoseconds or a factor of more than one hundred above the threshold detection level of x-ray detectors 10' and 110 embodying this invention. In general, the higher the level of the x-ray flux, the greater the flexibility in using the x-ray detectors of this invention. When the quantity of x-rays is greater, it is easier to select limited regions of the x-ray spectrum for observation without reducing the intensity of the light produced by the detectors of this invention to an undetectable level. It also becomes possible to produce larger images at entrance slit 44 which can be better resolved after being intensified by image converter camera 45 and to split the light beam several times to obtain a series of snapshots separated in time without reducing the intensity of each segment of the light beam below a detectable level.

Detectors embodying this invention may also be used to analyze other intense x-ray sources such as targets irradiated by electron beams or x-ray lasers and the emitter and associated collecting and focusing or imaging optics of this invention may also be used to analyze fluxes of charged particles accelerated to relativistic velocities such as those produced by atomic particle acclerators.

I claim:

1. An x-ray detector comprising, a plurality of cathodes each adapted to emit electrons when irradiated by x-rays, an electron accelerator for accelerating electrons emitted by each of said cathodes to a relativistic velocity, a Cherenkov emitter associated with each of said cathodes and receiving electrons from its associated cathode after the electrons have been accelerated by said electron accelerator and emitting light, and an optical system associated with each of said Cherenkov emitters for collecting and focusing at least part of the light from its associated Cherenkov emitter on a photodetector, and a photodetector for detecting at least part of the light collected by said optical systems from said Cherenkov emitters.

2. The detector of claim 1 wherein said Cherenkov emitters comprise an emitter lens having a plane entrance face through which accelerated electrons pass which is perpendicular to the axis of said emitter lens and a conical exit surface from which light emitted by the accelerated electrons passes, said conical exit surface having a half angle chosen so that light rays within a given range of wavelengths which are emitted in a plane defined by the axis of said emitter lens and any radius vector of said emitter lens perpendicular to the axis thereof will be refracted by the conical surface into rays of light substantially parallel to the optical axis of said emitter lens.

3. The detector of claim 2 wherein said optical systems comprise a collector lens on the same optical axis as said emitter lens and receiving at least part of the light exiting from the conical surface of said emitter lens, said collector lens having a central plane surface through which parallel rays of light from said conical surface of said emitter lens pass and a smooth surface surrounding said plane surface and having a curvature to collect diverging rays of light from said conical surface of said emitter lens such that a fraction of the total light coming from said conical surface of said emitter lens emerges from said collector lens in rays of light substantially parallel to the optical axis of said collector lens.

4. An x-ray detector comprising, a cathode adapted to emit electrons when irradiated by x-rays, an electron accelerator for accelerating electrons emitted by said cathode to a relativistic velocity, a Cherenkov emitter receiving accelerated electrons from said electron accelerator and emitting light, an optical system for collecting at least part of the light from said Cherenkov emitter, a photodetector for detecting at least part of the light collected by said optical system from said Cherenkov emitter, and said electron accelerator comprises a pair of parallel plates of an electrically conductive material with one of said plates having said cathode thereon and the other of said plates engaging the entrance face of said Cherenkov emitter through which accelerated electrons enter into said Cherenkov emitter.

5. The detector of claim 4 wherein at least part of said other plate of said electron accelerator is deposited on said entrance face of said Cherenkov emitter.

6. An x-ray detector comprising, a cathode adapted to emit electrons when irradiated by x-rays, an electron accelerator for accelerating electrons emitted by said cathode to a relativistic velocity, a Cherenkov emitter receiving accelerated electrons from said electron accelerator and emitting light, an optical system for collecting at least part of the light from said Cherenkov emitter, a photodetector for detecting at least part of the light collected by said optical system from said Cherenkov emitter, imaging means forming an image of the source of x-rays, and means producing a magnetic field parallel to the desired direction of axial acceleration of electrons by said electron accelerator, said electron accelerator and said cathode being within said magnetic field such that said magnetic field decreases the magnitude of the transverse excursion of electrons emitted from said cathode, whereby the image resolution of the detector is improved.

7. The detector of claim 6 wherein said means producing a magnetic field comprises a solenoid coil surrounding said cathode and said electron accelerator.

8. The detector of claim 7 wherein said imaging means comprises grazing incidence mirrors.

9. The detector of claim 6 wherein said photodetector comprises an image converter camera.

10. The detector of claim 6 wherein said photodetector comprises a camera with an image intensifier and a shutter provided by an optically triggered Kerr cell controlled by a laser pulse less than 100 picoseconds in duration.

11. The detector of claim 4 which also comprises imaging means forming an image of the source of x-rays and said photodetector comprises a camera with an image intensifier and a shutter provided by an optically triggered Kerr cell controlled by a laser pulse.

12. An x-ray detector comprising, a cathode adapted to emit electrons when irradiated by x-rays, an electron accelerator for accelerating electrons emitted by said cathode to a relativistic velocity, a Cherenkov emitter receiving accelerated electrons from said electron accelerator and emitting light, an optical system for collecting at least part of the light from said Cherenkov emitter, a photodetector for detecting at least part of the light collected by said optical system from said Cherenkov emitter, and said Cherenkov emitter comprises an emitter lens having a plane entrance face through which accelerated electrons pass which is perpendicular to the axis of the lens and a conical exit surface from which light emitted by the accelerated electrons passes, said conical exit surface having a half angle chosen so that light rays within a given range of wavelengths which are emitted in a plane defined by the axis of the lens and any radius vector of the lens perpendicular to the axis thereof will be refracted by the conical surface into rays of light substantially parallel to the optical axis of said emitter lens.

13. The detector of claim 12 wherein said optical system comprises a collector lens on the same optical axis as said emitter lens and receiving at least part of the light exiting from the conical surface of said emitter lens, said collector lens having a central plane surface through which parallel rays of light from said conical surface of said emitter lens enter and a smooth surface surrounding said plane surface and having a curvature to collect diverging rays of light from said conical surface of said emitter lens such that a fraction of the total light coming from said conical surface of said emitter lens emerges from said collector lens in rays of light substantially parallel to the optical axis of said collector lens.

14. An x-ray detector comprising, a cathode adapted to emit electrons when irradiated by x-rays, an electron accelerator for accelerating electrons emitted by said cathode to a relativistic velocity, a Cherenkov emitter receiving accelerated electrons from said electron accelerator and emitting light, an optical system for collecting at least part of the light from said Cherenkov emitter, a photodetector for detecting at least part of the light collected by said optical system from said Cherenkov emitter, and said Cherenkov emitter comprises an emitter prism having a plane entrance face through which accelerated electrons pass which is perpendicular to the axis of said emitter prism and a conical reflecting surface from which light emitted by the accelerated electrons is reflected, said conical reflecting surface having a half angle chosen so that light rays which are emitted in a plane defined by the axis of said emitter prism and any radius vector of said emitter prism perpendicular to the axis thereof will be reflected by said conical reflecting surface into rays of light substantially parallel to the optical axis of said emitter prism.

15. The detector of claim 14 wherein said optical system comprises a collector lens on the same optical axis as said emitter prism and receiving at least part of the light reflected by said conical reflecting surface of said emitter prism, said collector lens having a central plane surface through which parallel rays of light from said conical reflecting surface of said emitter prism enter and a smooth surface surrounding said plane surface and having a curvature to coallect diverging rays of light from said emitter prism such that a fraction of the total light coming from said emitter prism emerges from said collector lens in rays of light substantially parallel to the optical axis of said collector lens.

16. An x-ray detector comprising, a cathode adapted to emit electrons when irradiated by x-rays, an electron accelerator for accelerating electrons emitted by said cathode to a relativistic velocity, a Cherenkov emitter receiving accelerated electrons from said electron accelerator and emitting light, an optical system for collecting at least part of the light from said Cherenkov emitter, a photodetector for detecting at least part of the light collected by said optical system from said Cherenkov emitter, and said Cherenkov emitter comprises a thin slab emitter and the relativistic velocity of electrons accelerated by said electron accelerator and impinging on the entrance face of said thin slab emitter is both greater than one over the index of refraction of said thin slab emitter and less than the square root of the quantity of one over the square of the index of refraction of said thin slab emitter minus one.

17. The detector of claim 16 wherein said optical system comprises first and second conical mirrors constructed and arranged to receive and reflect into parallel rays of light at least a fraction of the light emitted in said thin slab emitter in a plance defined by the optical axis of said thin slab emitter and a radius vector perpendicular to the axis of said thin slab emitter, the half angle of said first conical mirror being equal to the quantity of the half angle of said second conical mirror minus one half of the angle at which light emitted in said plane emerges from the exit face of said thin slab emitter.

18. The detector of claim 17 wherein said optical system comprises a collector lens on the same optical axis as said conical mirrors and receiving at least part of the light exiting from said second conical mirror, said collector lens having a central plane surface through which parallel rays of light from said second conical mirror enter and a smooth surface surrounding said plane surface and having a curvature to collect diverging rays of light from said second conical mirror such that a larger fraction of the total light coming from said second conical mirror emerges from said collector lens in rays of light substantially parallel to the optical axis of said collector lens.

19. The detector of claim 16 which also comprises imaging means forming an image of the source of x-rays and means producing a magnetic field parallel to the desired direction of axial acceleration of electrons by said electron accelerator, said electron accelerator and said cathode being within said magnetic field such that said magnetic field decreases the magnitude of the transverse excursion of electrons emitted from said cathode, whereby the image resolution of the detector is improved.

20. The detector of claim 19 wherein said optical system comprises a doubly reflecting, collecting and imaging system having a first concave mirror and a second convex mirror for collecting and imaging light leaving the exit face of said thin slab emitter.

21. An x-ray detector comprising, a cathode adapted to emit electrons when irradiated by x-rays, an electron accelerator for accelerating electrons emitted by said cathode to a relativistic velocity, a Cherenkov emitter receiving accelerated electrons from said electron accelerator and emitting light, a spherical optical system for collecting at least part of the light from said Cherenkov emitter, a photodetector for detecting at least part of the light collected by said optical system from said Cherenkov emitter, said Cherenkov emitter comprises a fiber optic plate having a plurality of transparent fibers each embedded in an opaque cladding having a lower index of refraction than that of said fibers, each said fiber being constructed and arranged with an entrance face and an exit face essentially perpendicular to the longitudinal axis of said fiber and said longitudinal axis extending essentially parallel to the path of accelerated electrons entering said fiber through said entrance face, and the electrons accelerated by said electron accelerator and entering said transparent fibers of said fiber optic plate having a relativistic velocity which is less than one over the index of refraction of said opaque cladding, less than the square root of the quantity of one over the square of the index of refraction of said transparent fibers minus one, and also greater than one over the index of refraction of said transparent fibers.

22. An x-ray detector comprising, a cathode adapted to emit electrons when irradiated by x-rays, imaging means forming on said cathode an image of the source of x-rays, an electron accelerator for accelerating electrons emitted by said cathode to a relativistic velocity, a Cherenkov emitter receiving accelerated electrons from said electron accelerator and emitting light, an optical system for collecting at least part of the light from said Cherenkov emitter, a photodetector for detecting at least part of the light collected by said optical system from said Cherenkov emitter, means producing a magnetic field parallel to the desired direction of axial acceleration of electrons by said electron accelerator, said electron accelerator and said cathode being within said magnetic field such that said magnetic field decreases the magnitude of the transverse excursion of electrons emitted from said cathode such that the image resolution of the detector is improved, said Cherenkov emitter comprises a fiber optic plate having a plurality of transparent fibers embedded in an opaque cladding having a lower index of refraction than that of said fibers, and the electrons accelerated by said electron accelerator and entering said transparent fibers of said fiber optic plate having a relativistic velocity which is less than one over the index of refraction of said opaque cladding, less than the square root of the quantity of one over the square of the index of refraction of said transparent fibers minus one, and also greater than one over the index of refraction of said transparent fibers.

23. The detector of claim 22 wherein said optical system comprises a doubly reflecting, collecting and imaging system similar to a Burch all-reflecting microscope objective and having a first concave mirror and a second convex mirror for collecting and imaging light leaving the exit face of said fiber optic plate.

24. The detector of claim 22 wherein said means producing a magentic field comprises a solenoid coil surrounding said cathode and said electron accelerator.

25. The detector of claim 22 wherein said photodetector comprises an image converter camera.

26. The detector of claim 22 wherein said photodetector comprises a camera with an image intensifier and a shutter provided by an optically triggered Kerr cell controlled by a laser pulse.

27. An x-ray detector comprising a cathode adapted to emit electrons when irradiated by x-rays, an electron accelerator for accelerating electrons emitted by said cathode to a relativistic velocity, a Cherenkov emitter receiving accelerated electrons from said electron accelerator and emitting light, imaging means forming an image on said cathode of the source of such x-rays, and means producing a magnetic field parallel to the desired direction of axial acceleration of electrons by said electron accelerator, said electron accelerator and said cathode being within said magnetic field such that said magnetic field decreases the magnitude of the transverse excursion of electrons emitted from said cathode whereby the image resolution of the detector is improved.

28. The detector of claim 27 which also comprises an optical system for collecting at least part of the light from said Cherenkov emitter and reconstructing an image of the source of such x-rays, and a photodetector for recording the reconstructed image produced by said optical system.

29. The detector of claim 28 wherein said photodetector comprises a camera with an image intensifier and a shutter provided by an optically triggered Kerr cell controlled by a laser pulse having a duration of less than one hundred picoseconds.

30. A detector of a flux of high energy charged particles comprising a Cherenkov emitter receiving at least a portion of the charged particles and emitting light, an optical system for collecting at least a portion of the light from said Cherenkov emitter, a photodetector having a time resolution of less than 100 picoseconds for detecting and recording at least part of the light collected by said optical system, said Cherenkov emitter comprising an emitter lens having a plane entrance face through which charged particles pass which is essentially perpendicular to the axis of said emitter lens and a conical exit surface from which light emitted by said charged particles passes, said conical exit surface having a half angle chosen so that light rays within a given range of wavé lengths which are emitted in a plane defined by the axis of said emitter lens and any radius vector of said emitter lens perpendicular to the axis thereof will be refracted by the conical surface into rays of light substantially parallel to the optical axis of said emitter lens.

31. The detector of claim 30 which comprises a plurality of said Cherenkov emitters and an optical system associated with each of said Cherenkov emitters for collecting and focusing at least part of the light from its associated Cherenkov emitter on a photodetector.

32. The detector of claim 30 wherein said optical system comprises a collector lens on the same optical axis as said emitter lens and receiving at least part of the light exiting from the conical surface of said emitter lens, said collector lens having a central plane surface through which parallel rays of light from said conical surface of said emitter lens pass and a smooth surface surrounding said plane surface and having a curvature to collect diverging rays of light from said conical surface of said emitter lens such that a fraction of the total light coming from said conical surface of said emitter lens emerges from said collector lens in rays of light substantially parallel to the optical axis of said collector lens.

33. A detector of a flux of high energy charged particles with relativistic velocities comprising a Cherenkov emitter receiving at least a portion of the charged particles and emitting light, an optical system for collecting at least a portion of the light from said Cherenkov emitter, a photodetector having a time resolution of less than 100 picoseconds for detecting and recording at least part of the light collected by said optical system, and said Cherenkov emitter comprising an emitter prism having a plane entrance face which is perpendicular to the axis of said emitter prism and through which at least a portion of the charged particles pass and a conical reflecting surface from which light emitted by the charged particles is reflected, said conical reflecting surface having a half angle chosen so that light rays which are emitted in a plane defined by the axis of said emitter prism and any radius vector of said emitter prism perpendicular to the axis thereof will be reflected by said conical reflecting surface into rays of light substantially parallel to the optical axis of said emitter prism.

34. The detector of claim 33 wherein said optical system comprises a collector lens on the same optical axis as said emitter prism and receiving at least part of the light reflected by said conical reflecting surface of said emitter prism, said collector lens having a central plane surface through which parallel rays of light from said conical reflecting surface of said emitter prism enter and a smooth surface surrounding said plane surface and having a curvature to collect diverging rays of light from said emitter prism such that a fraction of the total light coming from said emitter prism emerges from said collector lens in rays of light substantially parallel to the optical axis of said collector lens.

35. A detector of a flux of high energy charged particles with relativistic velocities comprising a Cherenkov emitter receiving at least a portion of the charged particles and emitting light, an optical system for collecting at least a portion of the light from said Cherenkov emitter, a photodetector having a time resolution of less than 100 picoseconds for detecting and recording at least part of the light collected by said optical system, said Cherenkov emitter comprises a thin slab emitter and the relativistic velocity of the charged particles impinging on the entrance face of said thin slab emitter is both greater than one over the index of refraction of said thin slab emitter and less than the square root of the quantity of one over the square of the index of refraction of said thin slab emitter minus one.

36. The detector of claim 35 wherein said optical system comprises first and second conical mirrors constructed and arranged to receive and reflect into parallel rays of light at least a fraction of the light emitted in said thin slab emitter in a plane defined by the optical axis of said thin slab emitter and a radius vector perpendicular to the axis of said thin slab emitter, the half angle of said first conical mirror being equal to the quantity of the half angle of said second conical mirror minus one half of the angle at which light emitted in said plane emerges from the exit face of said thin slab emitter.

37. The detector of claim 36 wherein said optical system comprises a collector lens on the same optical axis as said conical mirrors and receiving at least part of the light exiting from said second conical mirror, said collector lens having a central plane surface through which parallel rays of light from said second conical mirror enter and a smooth surface surrounding said plane surface and having a curvature to collect diverging rays of light from said second conical mirror such that a larger fraction of the total light coming from said second conical mirror emerges from said collector lens in rays of light substantially parallel to the optical axis of said collector lens.

38. The detector of claim 33 which also comprises imaging means forming an image of the source of the charged particles and wherein said optical system comprises a doubly reflecting, collecting and imaging system having a first concave mirror and a second convex mirror for collecting and imaging light leaving the exit face of said thin slab emitter.

39. A detector of a flux of high energy charged particles with relativistic velocities comprising a Cherenkov emitter receiving at least a portion of the charged particles and emitting light, an optical system for collecting at least a portion of the light from said Cherenkov emitter, a photodetector having a time resolution of less than 100 picoseconds for detecting and recording at least part of the light collected by said optical system, and said Cherenkov emitter comprises a fiber optic having a plurality of transparent fibers embedded in an opaque cladding having a lower index of refraction than that of said fibers, each said fiber being constructed and arranged with an entrance face and an exit face essentially perpendicular to the longitudinal axis of said fiber and said longitudinal axis extending essentially parallel to the path of charged particles entering said fiber through said entrance face, and said charged particles upon entering said fibers of said optic plate having a relativistic velocity which is less than one over the index of refraction of said opaque cladding, less than the square root of the quantity of one over the square of the index of refraction of said transparent fibers minus one, and also greater than one over the index of refraction of said transparent fibers.

40. The detector of claim 39 which also comprises imaging means forming an image of the source of such charged particles and means producing a magnetic field parallel to the longitudinal axis of said fibers of said fiber optic plate and constructed and arranged so that such charged particles pass through such magnetic field prior to entering said transparent fibers to decrease the magnitude of the transverse excursion of such charged particles so as to improve the image resolution of the detector.

41. The detector of claim 39 wherein said optical system comprises a doubly reflecting, collecting and imaging system similar to a Burch all-reflecting microscope objective and having a first concave mirror and a second convex mirror for collecting and imaging light leaving the exit face of said fiber optic plate.

42. A detector of a flux of high energy charged particles with relativistic velocities comprising a Cherenkov emitter receiving at least a portion of the charged particles and emitting light, an optical system for collecting at least a portion of the light from said Cherenkov emitter, a photodetector having a time resolution of less than 100 picoseconds for detecting and recording at least part of the light collected by said optical system, said Cherenkov emitter comprises a fiber optic plate having a plurality of transparent fibers each embedded in an opaque cladding having a lower index of refraction than that of said fibers, each said fiber being constructed and arranged with an entrance face and an exit face essentially perpendicular to the longitudinal axis of said fiber and said longitudinal axis extending essentially parallel to the path of the charged particles entering said fiber through said entrance face, and the charged particles entering said transparent fibers of said fiber optic plate having a relativistic velocity which is less than one over the index of refraction of said opaque cladding, less than the square root of the quantity of one over the square of the index of refraction of said transparent fibers minus one, and also greater than one over the index of refraction of said transparent fibers.

* * * * *